United States Patent
Miyata et al.

(10) Patent No.: US 6,572,003 B2
(45) Date of Patent: Jun. 3, 2003

(54) SEAM WELDING APPARATUS AND SEAM WELDING METHOD

(75) Inventors: Junji Miyata, Tokyo (JP); Nobuyoshi Nakatani, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/862,702

(22) Filed: May 23, 2001

(65) Prior Publication Data

US 2002/0011469 A1 Jan. 31, 2002

(30) Foreign Application Priority Data

Jul. 28, 2000 (JP) ......................................... 2000-229289

(51) Int. Cl.[7] .......................... B23K 1/14; B23K 37/04; B23K 37/00; B23K 9/02
(52) U.S. Cl. ........................ 228/49.1; 228/44.3; 228/4.1; 228/5.7; 228/144; 228/153; 219/101; 219/105
(58) Field of Search .......................... 228/44.3, 49.1, 228/141.1–144, 153, 4.1, 5.1, 5.7, 49.4; 219/81–83, 101–105

(56) References Cited

U.S. PATENT DOCUMENTS

| | | | | |
|---|---|---|---|---|
| 3,618,844 A | * | 11/1971 | Morley et al. | ................. 219/82 |
| 3,674,972 A | * | 7/1972 | Stahnke | .................... 100/33 R |
| 3,689,058 A | * | 9/1972 | Schraner | .................... 219/101 |
| 4,096,375 A | * | 6/1978 | Fujino et al. | ................ 219/101 |
| 4,103,139 A | * | 7/1978 | Zollinger | .................... 219/101 |
| 4,129,244 A | * | 12/1978 | Morris | ......................... 228/13 |
| 4,192,055 A | * | 3/1980 | Moore | ........................ 228/49.1 |
| 4,461,946 A | * | 7/1984 | Kratschmer | ................. 228/49.1 |
| 4,512,844 A | * | 4/1985 | Kobiella | ....................... 228/170 |
| 4,586,644 A | * | 5/1986 | Raush et al. | ................ 228/49.1 |
| 4,623,777 A | * | 11/1986 | Aihara et al. | ........... 219/121.13 |
| 4,675,495 A | * | 6/1987 | Kielbania et al. | ............ 219/101 |
| 4,765,532 A | * | 8/1988 | Uomoti et al. | .............. 228/212 |
| 4,871,414 A | * | 10/1989 | Niedrig | .................. 100/33 PB |
| 4,973,089 A | * | 11/1990 | Wheeler et al. | ............. 228/170 |
| 5,883,353 A | * | 3/1999 | Yoshida et al. | ................ 219/81 |
| 2001/0042774 A1 | * | 11/2001 | Miyata et al. | ............ 100/33 R |

FOREIGN PATENT DOCUMENTS

| | | | |
|---|---|---|---|
| JP | 05-212549 A | * | 8/1993 |
| JP | 06-39551 A | * | 2/1994 |

* cited by examiner

Primary Examiner—Tom Dunn
Assistant Examiner—L. Edmondson
(74) Attorney, Agent, or Firm—Sughrue Mion, PLLC

(57) ABSTRACT

To provide a seam welding apparatus and a seam welding method that may operate at a low pressure to obtain a suitable overlapped alignment amount. In the seam welding apparatus, a trailing plate clamp moving means is provided with link mechanisms for overlapping and aligning a leading end of a trailing plate with a trailing end of a leading plate and a link drive source for operating the link mechanisms under an extended condition. The link mechanisms are arranged in parallel along both side edges of the trailing plate. The pair of link mechanisms are connected to a link drive source to form a parallel link mechanism assembled through a coupling link. Also, a movable portion of the leading plate clamp means has a tilt pivot. This tilt pivot is adapted to be movable so that the overlapped alignment amount may be adjusted.

12 Claims, 25 Drawing Sheets

OVERLAP ALLOWANCE
COMPENSATION
REFERENCE LINE

OVERLAP ALLOWANCE
COMPENSATION
REFERENCE LINE

OVERLAP ALLOWANCE COMPENSATION REFERENCE LINE

SEAM WELDING APPARATUS AND SEAM WELDING METHOD

BACKGROUND OF THE INVENTION

1. Field of the Invention

The present invention relates to, for example, a seam welding apparatus for cutting a trailing end of a leading plate and a leading end of a trailing plate and bonding them together in a process line of metal plates, and more particularly to a seam welding apparatus including a movable portion of a leading plate clamp means adapted to be tiltable for holding the leading plate for overlap alignment, a movable portion of a trailing plate clamp means adapted to be movable toward the leading plate while holding the trailing plate, a shearing, means adapted for cutting the trailing end of the leading plate held by the movable portion of the leading plate clamp means and the leading end of the trailing plate held by the movable portion of the trailing plate clamp means before the overlap alignment, a trailing plate clamp moving means adapted to move the movable portion of the trailing plate clamp means for overlapping and aligning the leading end of the sheared trailing plate with the trailing end of the leading plate toward the leading plate, and a welding machine adapted to weld the overlapped alignment portion of the trailing end and the leading end in a transverse direction of the plates, and a seam welding method.

2. Related Art

FIGS. 17, 18 and 19 show a conventional seam welding apparatus used in a process line of metal plates, which is substantially the same as that shown in Japanese Patent Application Laid-Open No. 5-212549. FIG. 17 is a schematic frontal view of FIG. 1 of that publication for the sake of simplification, FIG. 18 is a left side elevational view and FIG. 19 is a cross-sectional view taken along the line A—A of FIG. 18.

Also, FIGS. 20 to 23 are views showing the steps of the conventional seam welding apparatus shown in FIGS. 17 to 19. FIG. 24 is a plan view of the conventional apparatus. FIG. 25 is a side elevational view showing the overlap condition. FIG. 26 is an enlarged perspective view showing the overlap portion. FIG. 27 is a perspective view showing a carriage C frame.

In FIGS. 17 to 27, for example, in the case where a thickness of the final welded overlapped alignment portion of the two components (plates) to be welded may exceed 130% of a thickness of the original single plate or alternatively in the case where the restrictive weld quality is not needed, the amount of the overlapped alignment portion of the two plates is increased; that is, the width of the overlapped alignment portion is increased so that a width from a start of weld to an end of weld, i.e., the overlapped alignment amount may be kept constant.

However, in contrast, for example, in the case where the thickness of the final welded overlapped alignment portion must be very small like the case where the thickness is not to exceed the range of 105% to 130% of the original single plate, or alternatively in the case where a very high standard is to be applied to the enhancement of the joint quality including the weld strength, if the width of the overlapped alignment portion from the start of weld to the end of weld is kept constant, in order to maintain the amount (width) at a certain level upon welding, it is necessary to impart the function for fixing the components to be welded firmly thereto. However, it is more effective and general to give the function for compensating the overlapped alignment amount thereto.

For instance, in advance, in view of an escape amount of the overlapped and aligned plates generated gradually from the start end side of weld to the end side of weld assuming that the most suitable overlapped alignment amount at the weld start end be represented by L1 in accordance with various parameters such as material, thickness, hardness or the like of the leading plate 1 and the trailing plate 2, the overlapped alignment amount at the end of weld is compensated for to the overlapped alignment amount L2 that is larger than the overlapped alignment amount L1 at the end of weld by the escape amount. It is less expensive to impart such a compensation function to the apparatus than to provide a strong fixing means in manufacturing the seam welding apparatus.

Working steps in the conventional seam welding apparatus provided with such a compensation function will now be described with reference to FIGS. 17 to 27.

Old First Step

First of all, in FIG. 20, the trailing end of the leading plate 1 and the leading end of the trailing plate 2 are kept stopped at a suitable cutting distance in a cutting position within the seal welding apparatus.

Old Second Step

Subsequently, in FIG. 21, a moving portion 3a of a leading plate clamp means for holding the leading plate 1 and a movable portion 4a of a trailing plate clamp means for holding the trailing plate 2 are moved to predetermined positions, and the leading plate 1 and the trailing plate 2 are firmly clamped by the two clamps, respectively.

Old Third Step

Subsequently, in FIG. 22, the shearing means is provided integrally with a trailing end cutter for cutting the trailing end of the leading plate and a leading end cutter for cutting the leading end of the trailing plate that are engaged with each other from above and from below, respectively. In this example, a double cut shear provided in the carriage C frame 5 serves as this. A lower blade unit 6 of the double cut shear having a U-shaped cross-section is raised and at the same time, an upper blade unit 7 having a U-shaped cross-section is lowered to thereby simultaneously cut the trailing end of the leading plate 1 and the leading end of the trailing plate 2 in parallel.

Old Fourth Step

Subsequently, in FIG. 23, after the completion of the shearing action by the above-described shearing means, the lower blade unit 6 is lowered and at the same time, the upper blade unit 7 is raised to bring the double cut shear back to the original position.

Old Fifth Step

In this example, subsequently, in order to overlap and align the trailing end of the leading plate 1 and the leading end of the trailing plate 2 with each other, the movable portion 3a of the leading plate clamp means is tilted so that the trailing end of the leading plate 1 is located over the other.

Old Sixth Step

Subsequently, during the operation from the above-described old first step to the old fifth step, i.e., to the original position, in order to overlap and align, an advance end stop position for stopping when the movable portion 4a of the trailing plate clamp means is advanced toward the movable portion 3a of the leading plate clamp means is adjusted in advance.

This will be described with reference to FIG. 19 and FIGS. 24 to 26.

In FIGS. 24, 25 and 26, first of all, in order to obtain the optimum overlapped alignment amount L1 at the weld start end, an interval between a weld start end adjusting stopper 9 mounted on the moving portion 4a of the trailing plate clamp means for moving toward the moving portion 3a of the leading plate clamp means, and a weld start end adjusting stopper 11 mounted on a fixed portion 4b of the trailing plate clamp means for moving by a weld start end overlapped alignment amount adjusting and driving unit 10 is adjusted to a distance obtained by adding L11 in view of the mounting width position W2 of the weld start end adjusting stopper 9 and the weld start end adjusting stopper 11 to the cutting width L0 with respect to the plate width W1 of the plates to be welded.

On the other hand, in order to obtain the optimum overlapped alignment amount L2 at the weld terminal end, an interval between a weld terminal end adjusting stopper 12 mounted on the moving portion 3a of the leading plate clamp means for moving toward the movable portion 3a of the leading plate clamp means and a weld terminal end adjusting stopper 14 mounted on a fixed portion 4b of the trailing clamp means for moving by a weld terminal end overlapped alignment amount adjusting and driving unit 13 is adjusted to a distance obtained by adding L21 in view of the mounting width position W2 of the weld terminal end adjusting stopper 12 and the weld terminal end adjusting stopper 14 to the cutting width L0 with respect to the plate width W1 of the plates to be welded.

Old Seventh Step

After the positions of the weld start end adjusting stopper 11 and the weld terminal end adjusting stopper 14 have been thus adjusted, the movable portion 4a of the trailing plate clamp means is moved toward the moving portion 3a of the leading plate clamp means by clamp forwarding cylinders 15a and 15b mounted on the fixed portion 4b of the trailing plate clamp means. Thereafter, if the tilt of the tilted movable portion 3a of the leading plate clamp means in the foregoing fifth step is returned back, the overlap and alignment that is needed for welding may be performed as shown in FIGS. 25 and 26.

Old Eighth Step

Subsequently, in FIG. 27, an upper electrode unit 17 mounted on an upper electrode pressurizing unit 16 is lowered by the lowering pressurizing operation of the upper electrode pressurizing unit 16.

Also, an upper electrode wheel 18 mounted rotatably on the upper electrode unit 17 and a lower electrode wheel 20 mounted rotatably on a lower electrode unit 19 are brought into contact with each other while subjected to the weld pressure.

Old Ninth Step

Subsequently, in FIGS. 17, 18 and 19, the carriage C frame 5 is moved by a carriage C frame moving unit 24 while a weld current is caused to flow from a weld power source unit 21 through an upper conductive member 22, the upper electrode unit 17, the upper electrode wheel 18, the lower electrode wheel 20, the lower electrode unit 19 and a lower conductive member 23 (FIG. 18).

Thus, the upper electrode wheel 18 and the lower electrode wheel 20 are caused to ride over the overlapped alignment portion of the leading plate 1 and the trailing plate 2 while moving the carriage C frame 5, thereby welding in the transverse direction of the plates.

In the above-described conventional steps, in order to maintain the stop position firmly when the movable portion 4a of the trailing plate clamp means moves toward the movable portion 3a of the leading plate clamp means, it is necessary to provide a strong enough force to resist so as not to reduce the overlapped alignment amount by the component of the weld pressure upon welding.

FIG. 28 is a cross-sectional view showing a state before the melting by the welding the overlapped alignment portion, and FIG. 30 is a cross-sectional view showing a state immediately before the welded condition.

In the metal plates as the members to be welded, for example, if the thickness t is 3 mm and the tension σ is 60 kgf/mm$^2$, the weld pressure F is 3,000 kgf and the overlapped alignment amount δ1 at the weld start end is the same as the plate thickness at 3 mm. These parameters are determined generally experimentally.

FIG. 29 is a view showing the weldpressure immediately before the melting and its component. A slip angle θ1 has a horizontal portion of the weld overlap portion. However, since the weld current until the melting is caused to flow therethrough, a plastic deformation easily occurs in the members to be welded. In this example, the slip angle is 26.6 degrees. Also, if 2θ1 is a wedge angle, the component P1 by the weld pressure at this time becomes 2,995 kgf (1=F X cos θ½×sin θ1).

In FIG. 30, in a condition infinitely close to the completion of the welding, the molten surface angle θ$_2$ is 45 degrees and the component P2 due to the weld pressure is 1,500 kgf. Furthermore, a component to exclude the molten material corresponding to a hatched area in FIG. 30 is applied.

This component is close to the infinite value until the overlapped alignment amount becomes zero unless the leading plate 1 and the trailing plate 2 have elastic deformation in the traveling direction of the metal strips, i.e., the leading plate 1 and the trailing plate 2. However, in reality, since the elastic deformation occurs on the welding machine side in addition to the members to be welded or the slippage gap of the guides exists or the like, the force becomes about 1.5 to 2 times of the above-described component P.

This component is supported mainly by the trailing plate clamp forwarding cylinder 15a at the weld start end side, and is supported mainly by the trailing plate clamp forwarding cylinder 15b at the weld terminal end side.

As described above, in order to resist the large components by the weld pressure, conventionally, a high output is obtained by using cylinders actuated at, for example, a high hydraulic pressure exceeding 7.0 Mpa in general as the trailing plate clamp forwarding cylinders 15a and 15b.

However, if such a high hydraulic pressure is used to provide a large output, it is necessary to arrange a high pressure resistive pipe to cause a problem that the piping cost or maintenance cost is increased in comparison with a low pressure resistive pipe.

Also, there is a problem that an oil leakage would be likely to occur.

On the other hand, in order to solve such a problem, if cylinders that operate at a low pressure, for example, 1.0 Mpa or less are used simply instead of the conventional cylinders that operate at a high hydraulic pressure, a diameter of the cylinders for obtaining the predetermined high output has to be extremely increased. As a matter of fact, it is difficult to arrange the apparatus. This does not solve the problem actually.

An object of the present invention is to provide a seam welding apparatus and a seam welding method that may overcome the above-described defects, and operates at a low pressure to obtain a suitable overlapped alignment amount.

In a first aspect of this invention, a seam welding apparatus including a movable portion of a leading plate clamp means adapted to be tiltable for holding the leading plate for overlap alignment, a movable portion of a trailing plate clamp means adapted to be movable toward the leading plate while holding the trailing plate, a shearing means adapted for cutting the trailing end of the leading plate held by the movable portion of the leading plate clamp means and the leading end of the trailing plate held by the movable portion of the trailing plate clamp means before the overlap alignment, a trailing plate clamp moving means adapted to move the movable portion of the trailing plate clamp means for overlapping and aligning the leading end of the sheared trailing plate with the trailing end of the leading plate toward the leading plate, and a welding machine adapted to weld the overlapped alignment portion of the trailing end and the leading end in a transverse direction of the plates, is characterized in that the trailing plate clamp moving means comprises a link mechanism for overlapping and aligning the leading end of the trailing plate with the trailing end of the leading plate in a fully extended condition or in the vicinity of the fully extended condition and a link drive source for actuating the link mechanism. Note that, hereinbelow, "a fully extended condition or in the vicinity of the fully extended condition" is referred to simply as "a fully extended condition".

In a second aspect of this invention, a seam welding apparatus according to claim 1, is characterized in that the trailing plate clamp moving means includes a pair of link mechanism along both side edges of the trailing plate.

In a third aspect of this invention, a seam welding apparatus according to claim 2, is characterized in that the pair of link mechanisms are coupled with a link drive source to form a parallel link mechanism assembled through a coupling link for simultaneously actuating the pair of link mechanism.

In a fourth aspect of this invention, a seam welding apparatus according to any one of claims 1 to 3, is characterized in that the movable portion of the leading plate clamp means has tilt pivots arranged, respectively, on the weld start end side and the weld terminal end side in a transverse direction of the leading plate, either one of the tilt pivots of the weld start end side and the weld terminal end side is arranged to be movable so that the overlapped alignment amount may be adjusted and moved by an overlapped alignment adjusting link mechanism provided with an overlapped alignment adjusting and driving source.

In a fifth aspect of this invention, a seam welding apparatus according to claim 4, is characterized in that the overlapped alignment amount adjusting link mechanism is arranged to be identified with the overlapped alignment direction in the fully extended condition, and the overlapped alignment adjusting and driving source is coupled substantially in a direction perpendicular to the overlapped alignment direction.

In a sixth aspect of this invention, a seam welding apparatus according to claim 3, is characterized in that the other end, which is not coupled with the movable portion of the trailing plate clamp means, of the link mechanism of the weld start end side and the weld terminal end side forming the trailing plate clamp moving means is supported movably so that the overlapped alignment amount may be adjusted.

In a seventh aspect of this invention, a seam welding apparatus according to claim 6, is characterized in that the other end, which is not coupled with the movable portion of the trailing plate clamp means, of the link mechanism of the weld start end side and the weld terminal end side forming the trailing plate clamp moving means is adjusted and moved by a receiving portion for bearing such other end, a guide portion for guiding the receiving portion movably, and an overlapped alignment amount adjusting and driving source for moving the guide portion.

In an eighth aspect of this invention, a seam welding apparatus according to claim 3, characterized in that the other end, which is not coupled with the movable portion of the trailing plate clamp means, of the link mechanism of the weld start end side and the weld terminal end side forming the trailing plate clamp moving means is moved in the transverse direction of the trailing plate.

In a ninth aspect of this invention, a seam welding apparatus according to any one of claims 1 to 3, characterized in that the shearing means is provided with a trailing end cutter for cutting the trailing end of the leading plate and a leading end cutter for cutting the leading end of the trailing plate and a cutting interval between the trailing end cutter and the leading end cutter is adapted so that the overlapped alignment amount at the weld terminal end side is greater than the overlapped alignment amount of the weld start end side in advance when the plates are to be overlapped with each other.

In a tenth aspect of this invention, a seam welding method using the seam welding apparatus according to any one of claims 1 to 3, characterized in that the plates are cut by the shearing means in advance when the plates are to be overlapped and aligned with each other so that the overlapped alignment amount at the weld terminal end side is greater than the overlapped alignment amount at the weld start end side, and the pair of link mechanisms forming the trailing plate clamp moving means are extended through an equal distance to thereby obtain a desired overlapped alignment amount.

In an eleventh aspect of this invention, a seam welding apparatus according to any one of claims 1 to 3, characterized in that the movable portion of the leading plate clamp means has tilt pivots arranged, respectively, to the weld start end side and the weld terminal end side in the transverse direction of the leading plate, a shaft of the tilt pivot on the weld start end side is used as an eccentric shaft, a shaft of the tilt pivot on the weld terminal end side is an eccentric shaft having a larger eccentric amount than that of the aforesaid eccentric shaft on the weld start end side, and the overlapped alignment amount, relative to the trailing plate, of the leading plate held by the movable portion of the leading plate clamp means is adjustable by the eccentric shaft drive source for rotating both the eccentric shafts individually.

In a twelfth aspect of this invention, a seam welding apparatus according to claim 11, characterized in that the shearing means is provided with a trailing end cutter for cutting the trailing end of the leading plate and a leading end cutter for cutting the leading end of the trailing plate, and a cutting interval between the trailing end cutter and the leading end cutter is adapted so that the overlapped alignment amount at the weld terminal end side is greater than the overlapped alignment amount of the weld start end side in advance when the plates are to be overlapped with each other.

DESCRIPTION OF THE PREFERRED EMBODIMENTS

Embodiment 1

Figure 1:
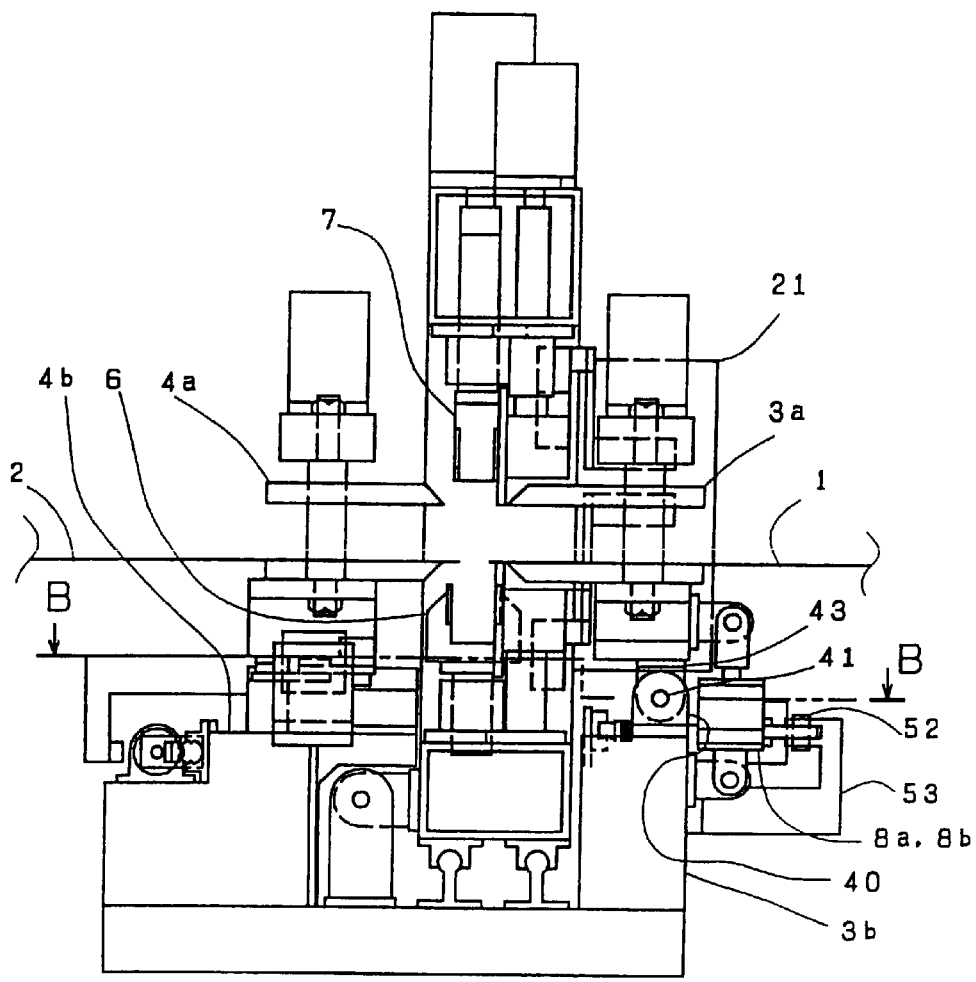
FIG. 1 is a frontal view of a seam welding apparatus for a process line of metal plates in accordance with a first embodiment.

A seam welding apparatus in accordance with a first embodiment includes a movable portion (3a) of a leading plate clamp means adapted to be tiltable for holding the leading plate 1 for overlap alignment, a movable portion (4a) of a trailing plate clamp means adapted to be movable toward the leading plate 1 while holding the trailing plate 2, a shearing means (5, 6, 7) adapted for cutting the trailing end of the leading plate 1 held by the movable portion (3a) of the leading plate clamp means and the leading end of the trailing plate 2 held by the movable portion (4a) of the trailing plate clamp means before the overlap alignment, a trailing plate clamp moving means adapted to move the movable portion (4a) the trailing plate clamp means for overlapping and aligning the leading end of the sheared trailing plate 2 with the trailing end of the leading plate 1 toward the leading plate 1, and a welding machine (16, 17, 18, 19, 20 and the like) adapted to weld the overlapped alignment portion of the trailing end (2) and the leading end (1) in a transverse direction (W1) of the plates.

Figure 2:
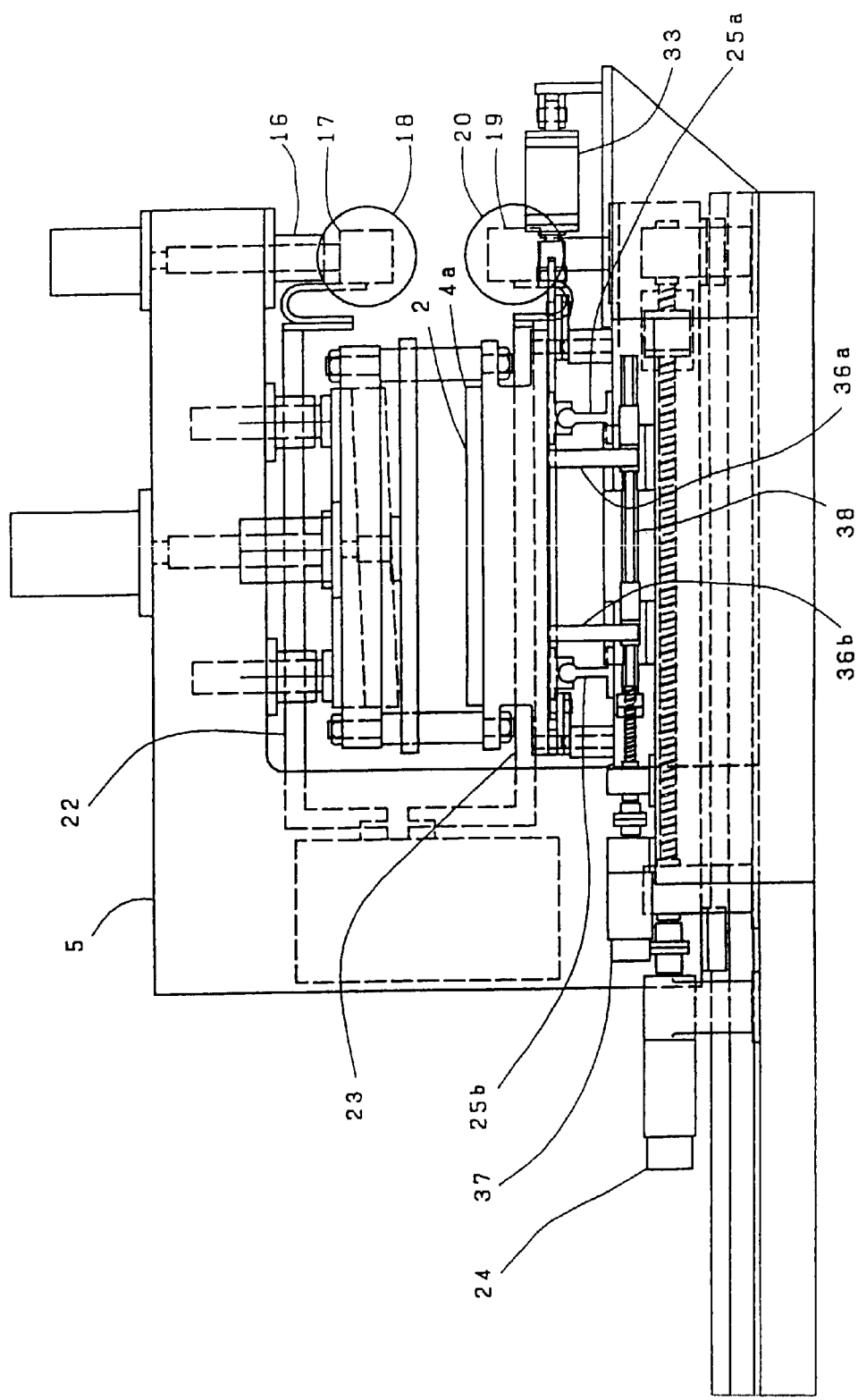
FIG. 2 is a side elevational view thereof.
Figure 3:
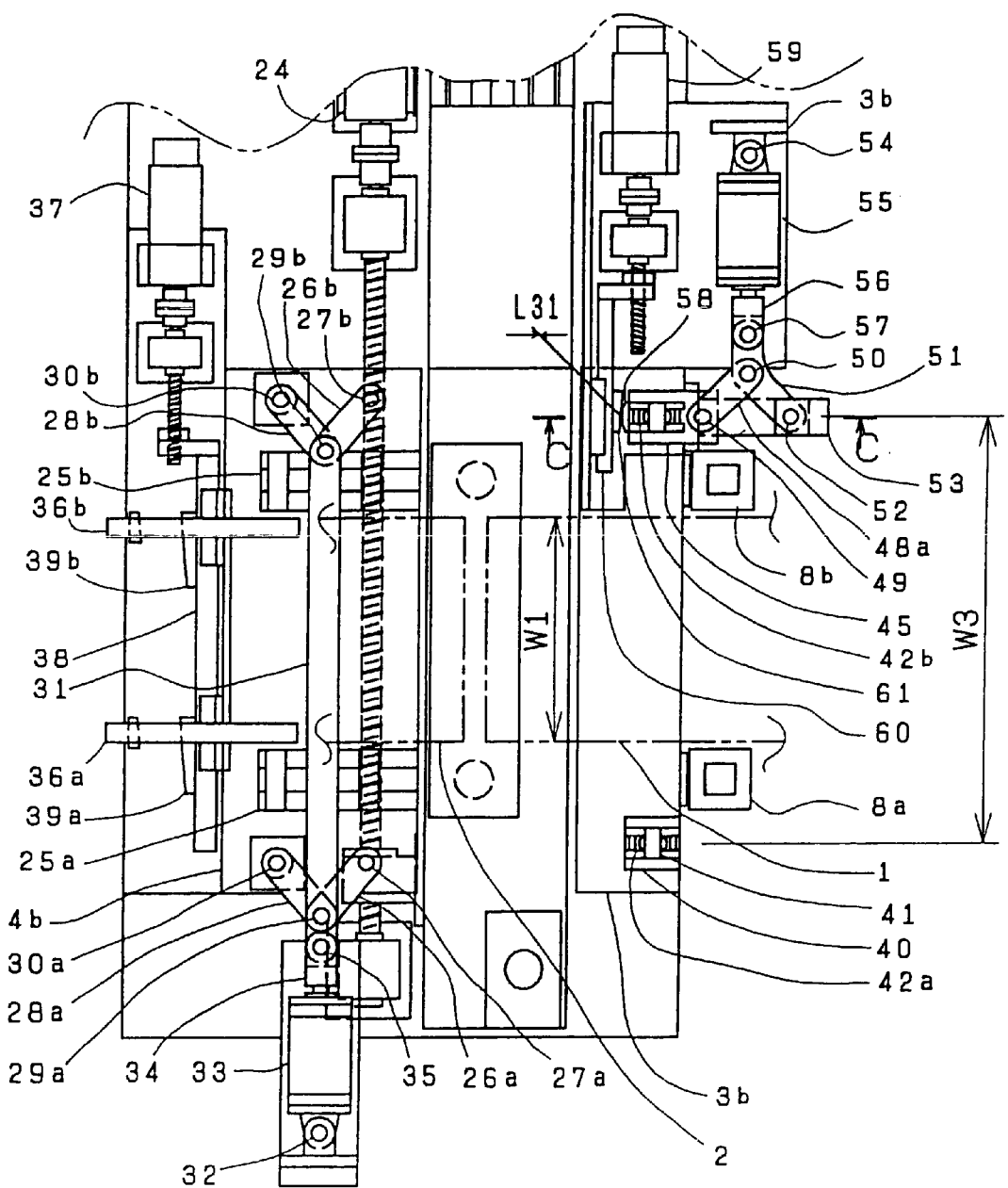
FIG. 3 is a cross-sectional view taken along the line B—B of FIG. 1.
Figure 4:
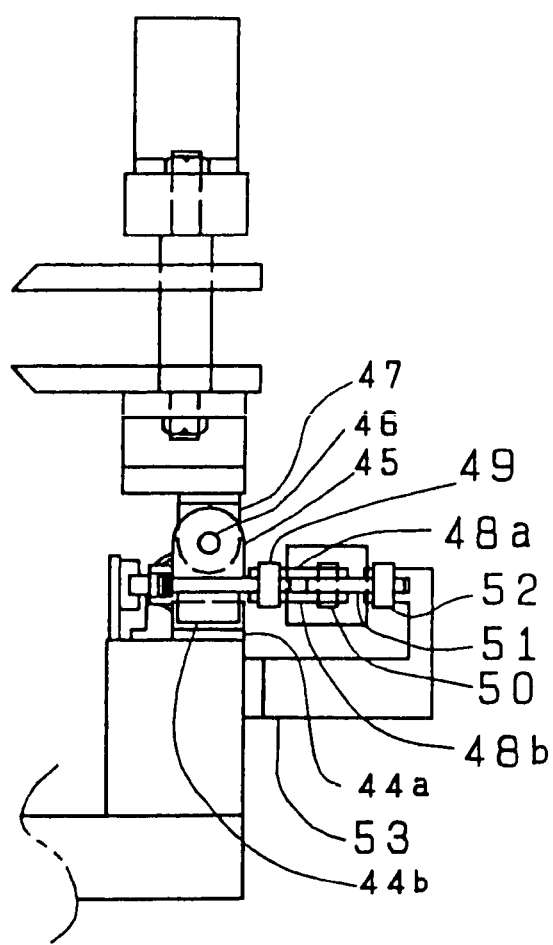
FIG. 4 is a view taken along the surface C—C of FIG. 3.

The first embodiment will now be described with reference to FIGS. 1 to 4. FIG. 1 is a frontal view of a seam welding apparatus for a process line of metal plates. FIG. 2 is a side elevational view thereof. FIG. 3 is a cross-sectional view taken along the line B—B of FIG. 1. FIG. 4 is a view taken along the surface C—C of FIG. 3. The same reference numerals as those in FIGS. 17 to 30 indicate the same components or members having the same function and structure. Therefore, the detailed explanation therefor will be omitted.

The trailing plate clamp moving means of the above-described seam welding apparatus is provided with a link mechanism for overlapping and aligning the leading end of the trailing plate 2 with the rear end of the leading plate 1 in the fully extended condition of the series of links or in the vicinity of the fully extended condition thereof. This link mechanism is operated by a small output cylinder as a link drive source, for example, a crevice type cylinder 33. This link drive source is coupled in a direction perpendicular to the fully extended direction of the link mechanism.

Furthermore, the above-described trailing plate clamp moving means forms a parallel link mechanism in which a pair of link mechanisms arranged in parallel along both side edges of the trailing plate 2, respectively, simultaneously work through a coupling link 31 and is adapted to actuate in accordance with the above-described crevice type cylinder 33 having a single link drive source.

The movable portion 4a of the trailing plate clamp means and the fixed portion 4b of the trailing plate clamp means forming the trailing plate clamp means are guided by a guide 25a and a guide 25b mounted on the above-described fixed portion 4b under the condition that the movable portion 4a holds the trailing plate 2, to be movable, i.e., supported to be movable in a forward direction of the movable portion 3a of the trailing plate clamp means.

The link mechanisms forming the above-described parallel link mechanism are assembled by links 26a, 26b, 28a, 28b and the coupling link 31.

Namely, the link 26a shown in FIG. 3 is mounted on a shaft 27a mounted on a lower side on the weld start end side of the movable portion 4a of the trailing plate clamp means and the other link 26b is mounted on a shaft 27b mounted on the lower side of the weld terminal end side of the movable portion 4a of the trailing plate clamp means to be rotatable, respectively.

One end side of the link 28a is coupled rotatably to the above-described link 26a through a shaft 29a, whereas the other end is coupled rotatably to a shaft 30a mounted on the fixed portion 4b of the trailing plate clamp means.

On the other hand, one end side of the link 28b is coupled rotatably to the above-described link 26b through a shaft 29b, whereas the other end side is coupled rotatably to a shaft 30b mounted on the fixed portion 4b of the trailing plate clamp means.

One end of the two ends of the coupling link 31 is coupled rotatably to the above-described shaft 29a and the other end is coupled rotatably to the shaft 29b, respectively, to form the parallel link mechanism together with the above-described links 26a and 28a and the links 26b and 28b.

This parallel link mechanism is actuated by a small output crevice type cylinder 33 (hereinafter also referred to as a cylinder 33) operated at a low pressure, for example, 1.0 Mpa or less, and provided in the fixed portion 4b of the trailing plate clamp means as the parallel link mechanism drive means for driving through the coupling link 31.

One of the crevice portions of the cylinder 33 as the link drive source is coupled rotatably to the fixed portion 4b of the trailing plate clamp means through the shaft 32. A tip end member 34 mounted at a tip end of the piston rod on the other side and the above-described coupling link 31 are coupled with each other through a shaft 35.

Accordingly, the movable portion 4a of the trailing plate clamp means is forwarded and driven toward the movable portion 3a of the leading trailing plate through the parallel link mechanism by the cylinder 33.

In order to obtain the suitable overlapped alignment amount for welding in response to various conditions such as the predetermined welding members, i.e., material of the leading plate 1 and the trailing plate 2 with the advance of the movable portion 4a of the above-described trailing plate clamp means, a moving side stopper 36a and a moving stopper 36b are provided on the lower side of the weld start end side of the movable portion 4a of the trailing clamp means and on the lower side of the weld terminal end side of the movable portion 4a of the trailing plate clamp means, respectively.

Reference numeral 38 denotes a guide that is moved in the transverse direction of the trailing plate 2 by a cylinder 37 as an overlapped alignment amount adjusting and driving unit disposed in the fixed portion 4b of the trailing plate clamp.

In the seam welding apparatus in accordance with the first embodiment, an interval between a weld start end adjusting stop 39a mounted on the above-described guide 38 and a moving side stop 36a mounted on the lower side of the weld start end side of the movable portion 4a of the trailing plate clamp means is adjusted in advance to a distance obtained by adding a cutting width L0 so as to be an optimum overlapped alignment amount L1 at the weld start end.

In order to obtain the optimum overlapped alignment amount L2 at the weld terminal end, the weld start end side of the movable portion 3a of the leading plate clamp is supported to be rotatably engaged through an automatic centering bearing 42a to a bracket 40 mounted at the weld start end side of the fixed portion 3b of the leading plate clamp means and a shaft 41 inserted into this bracket 40 by a bracket 43 mounted on the movable portion 3a of the leading plate clamp means.

Furthermore, the seam welding apparatus in accordance with this embodiment is provided on the side of the movable portion 3a of the leading plate clamp means with an overlapped alignment amount compensating means (hereinafter referred as a compensation means) for more finely adjusting the predetermined overlapped alignment amount.

The movable portion 3a of the leading plate clamp means has to be tilted so that the trailing end of the leading plate 1 is located over the trailing plate so as to allow the trailing plate 2 to move forward when the overlap and alignment are performed as described in conjunction with the conventional case.

For this reason, in this first embodiment, the tilt pivots are arranged at the weld start end side and the weld terminal end side in the transverse direction of the leading plate 1. Out of these pivots, the compensation means is formed by an overlapped alignment amount adjusting and driving source 55 (hereinafter referred as to an adjusting and driving source), an overlapped alignment adjusting link mechanism (hereinafter referred also as an adjusting link mechanism), an adjusting stopper means and the like in order to move the tilt pivot of the welding terminal end side to be finely adjustable. This will now be described below.

First of all, the adjusting link mechanism is arranged so that the fully extended direction is identified with the overlapped alignment direction and is coupled so that the piston rod of the adjusting and driving source 55 operates the adjusting link mechanism substantially in the direction perpendicular to the overlapped alignment direction.

In FIGS. 3 and 4, a bearing portion of a tilt shaft pivot on the weld terminal end side of the movable portion 3a of the leading plate clamp means is rotatably fitted through an automatic centering bearing 42b to a guide rail 44a mounted on the fixed portion 3b of the trailing plate clamp means, a bracket 45 mounted on the bearing unit 44b of the guide unit composed of a bearing unit 44b movable along the guide rail 44a and a shaft 46 inserted into the bracket 45, and is supported movably by a bracket 47 mounted at the weld terminal end side of the movable portion 3a of the leading plate clamp means.

This adjusting link mechanism is composed of links 48a and 48b and a link 51. First ends of the links 48a and 48b Are rotatably coupled to a bearing 49 fitted in the above-described bracket 45. The other ends are coupled rotatably to the link 51 through a shaft 50.

The above-described link 51 is rotatably coupled at one end with the bracket 53 mounted on the fixed portion 3b of the leading plate clamp means by a shaft 52. The other end is connected to a piston rod of an adjusting and driving power source 55.

The adjusting and driving power source will now be described.

The adjusting and driving power source 55 in accordance with the first embodiment is a crevice type cylinder (hereinafter simply referred to as a cylinder 55) having a small output to be operated at a low pressure at, for example, 1.0 Mpa or less. The crevice portion is coupled rotatably with a shaft 54 mounted on the fixed portion 3b of the leading plate clamp means.

On the other hand, a tip end member 56 mounted at a tip end of the piston rod of the cylinder 55 is coupled through a shaft 57 to be operated in a direction perpendicular to the fully extended direction of the above-described adjusting link mechanism.

Subsequently, the adjusting stop means is composed of a stopper 58 mounted at an end portion of the bracket 45 and an overlapped alignment amount adjusting stopper 61 (hereinafter simply referred to as an adjusting stop 61) for being moved in the transverse direction of the leading plate 1 while being guided by a guide unit 61 mounted on the fixed portion 3b of the leading plate clamp means.

This adjusting stopper 61 is wedge-shaped and is adapted so that this wedge is moved back and forth in such a manner that an interval between the side surface of the wedge and the stopper 58 changes. Accordingly, the stop position of the adjusting stopper 61 is selectively used so that the interval with the stop 58 may be adjusted.

By the way, upon welding, assuming the interval (distance) between the above-described stopper 58 and the overlapped alignment amount compensating adjusting stopper 61 to the optimum overlapped alignment amount L1 at the predetermined weld start end in response to the various parameters such as material, a plate thickness, a hardness and the like of the leading plate 1 and the trailing plate 2 to be welded together, the escape amount occurs due to the welding. Accordingly, it is necessary to set the overlapped alignment amount L2 that is greater by the predicted escape amount than the overlapped alignment amount L1 at the weld start end side.

For this reason, at the weld terminal end, the adjustment is performed to L31 in view of the mounting width position W3 of the stopper 58 and the overlapped alignment compensation adjusting stop 61 relative to the plate width W1 of the plates to be welded.

In the seam welding apparatus in accordance with this embodiment, it is possible to drive and move the movable portion 3a of the leading plate clamp means or the movable portion 4a of the trailing plate clamp means with a small output drive source in comparison with the conventional case, to resist the large components generated by the weld pressure to maintain and hold the overlapped alignment amount.

Also, since the overlapped alignment amount compensation adjusting means that may further finely adjust the predetermined overlapped alignment amount is provided, it is possible to set the overlapped alignment amount as desired and to perform the weld with a fine finish.

Incidentally, in the first embodiment, although the overlapped alignment amount compensation means is arranged on the side of the weld terminal end of the lading plate clamp means, it is possible to arrange the means on the side of the weld start side.

Embodiment 2

In a second embodiment, an overlapped alignment amount compensation means is provided on one link mechanism side (on the side of the fixed portion 4b of the trailing plate clamp means) constituting the parallel link mechanism on the trailing plate clamp means side instead of the overlapped alignment amount compensation means (hereinafter simply referred to as the compensation means) provided on the movable portion 3a side of the leading plate clamp means in the structure shown in the first embodiment.

The other end, which is not connected on the side of the movable portion 4a of the trailing plate clamp means, of the link mechanism of either one of the weld start end side and the weld terminal end side forming the trailing plate clamp moving means of the compensation means is supported to be movable so that the overlapped alignment amount maybe adjusted. The compensation means is composed of a receiving portion for bearing such other end, a guide portion for guiding movably the receiving portion, an overlapped alignment amount adjusting and driving power source for moving the guide portion and the like.

Figure 5:
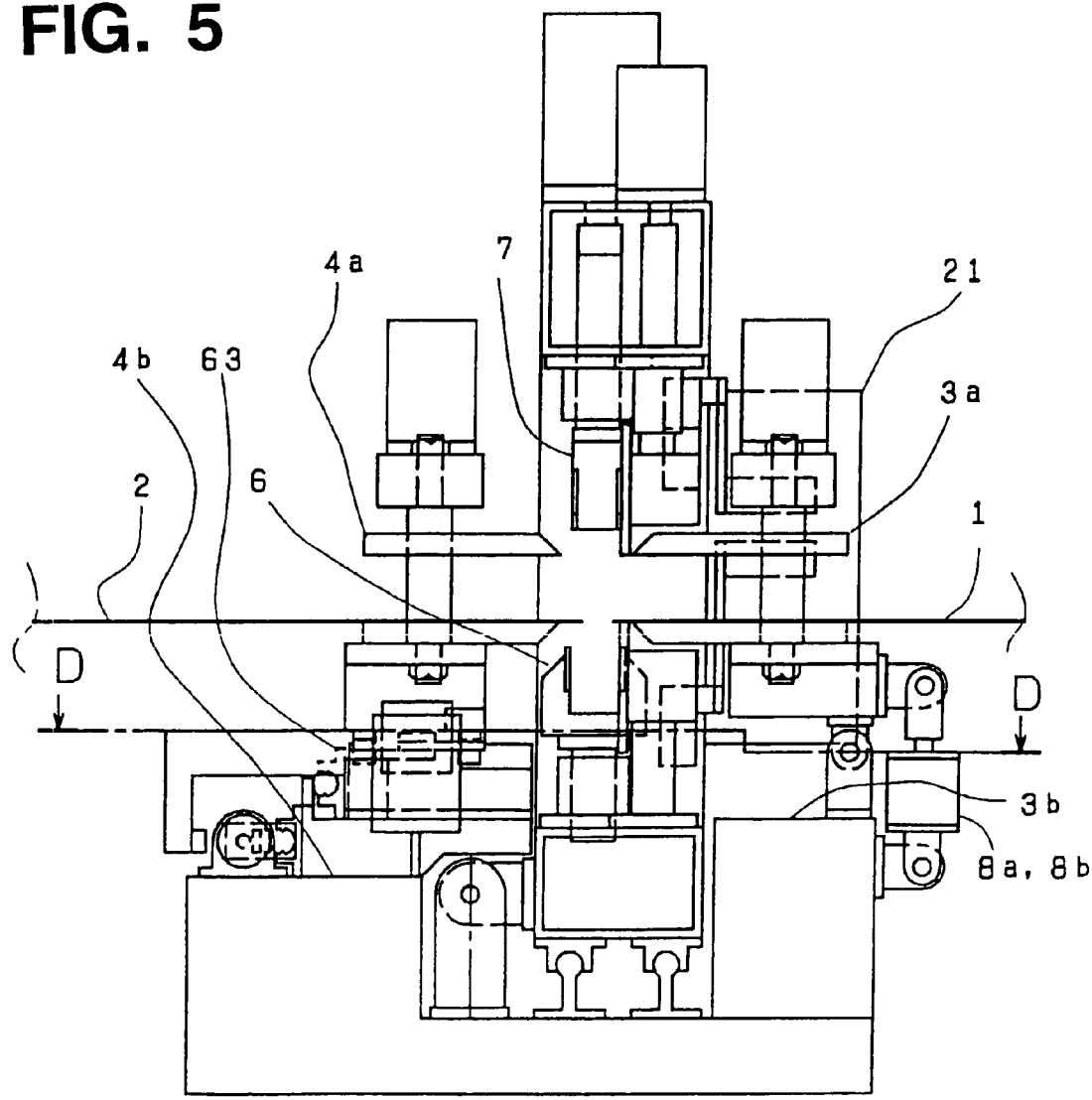
FIG. 5 is a frontal view of a seam welding apparatus for a process line of metal plates in accordance with a second embodiment.
Figure 6:
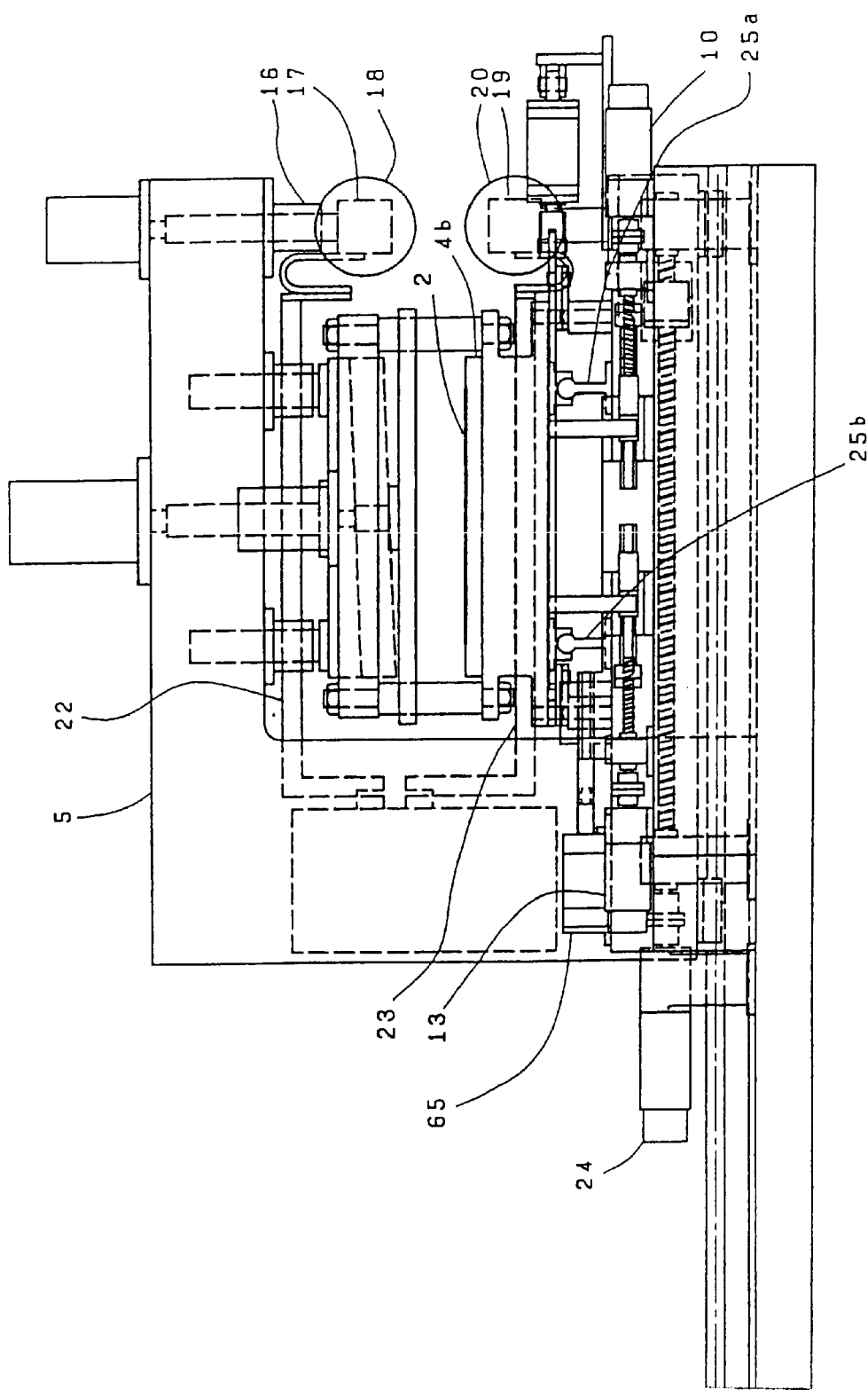
FIG. 6 is a side elevational view thereof.
Figure 7:
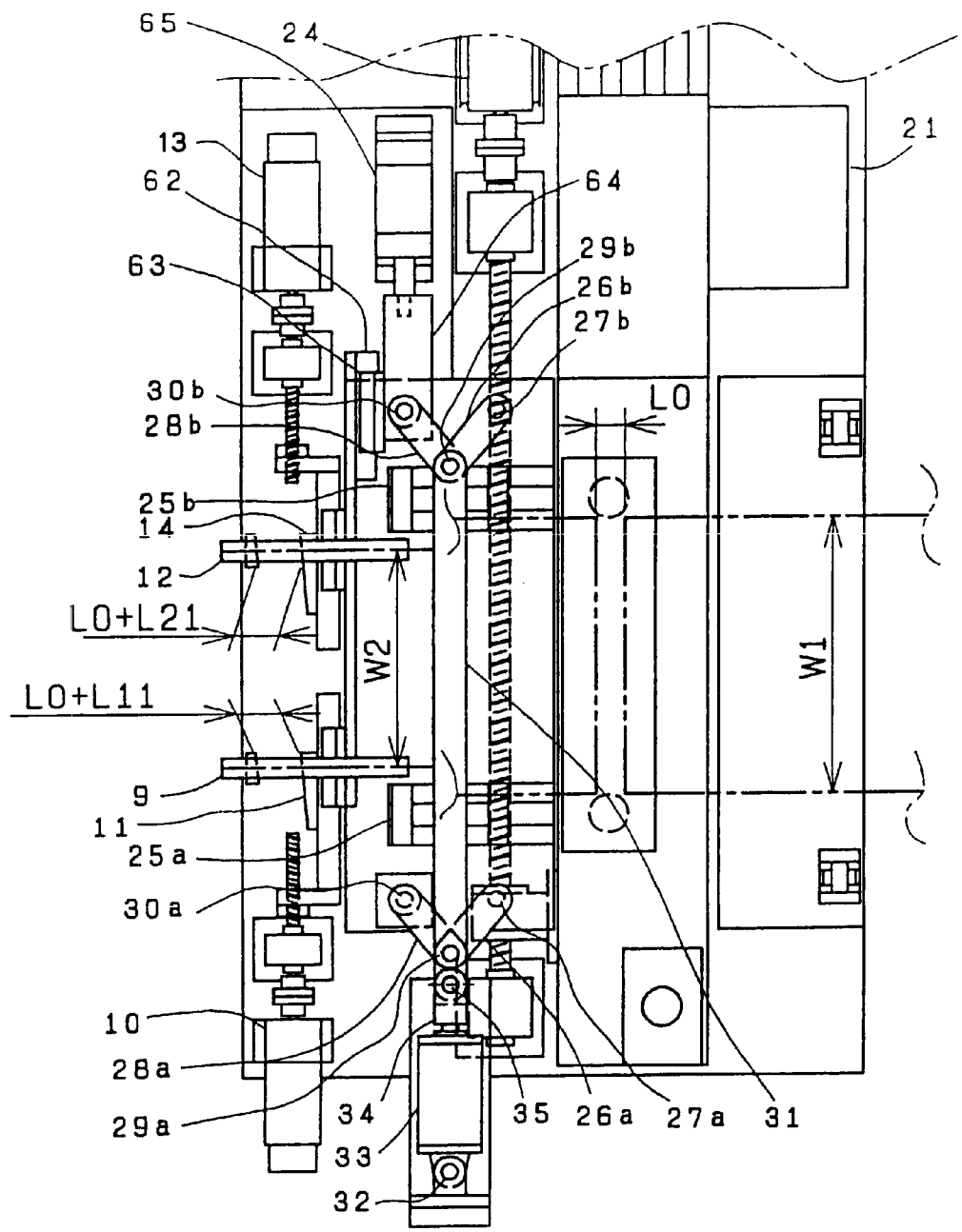
FIG. 7 is a cross-sectional view taken along the line D—D of FIG. 5.

The second embodiment will now be described with reference to FIGS. 5 to 7. FIG. 5 is a frontal view of a seam welding apparatus for a process line of metal plates. FIG. 6 is a right side elevational view thereof. FIG. 7 is a view taken along the cross-section D—D of FIG. 5. Incidentally, the same reference numerals as those in the drawings of the first embodiment and the conventional case indicate the same function and structure and the detailed explanation therefor will therefore be omitted.

In FIGS. 5 to 7, in the same manner, the movable portion 4a of the trailing plate clamp means forming the trailing plate clamp means is supported to be movable forward toward the movable portion 3a of the leading plate clamp means by guides 25a and 25b mounted on the fixed portion 4b of the trailing plate clamp means forming the trailing plate clamp means.

A link 26a forming the link mechanism is mounted on a shaft 27a mounted on a lower side on the weld start end side of the movable portion 4a of the trailing plate clamp means and the other link 26b is mounted on a shaft 27b mounted on the lower side of the weld terminal end side of the movable portion 4a of the trailing plate clamp means to be rotatable, respectively.

Also, one end of the link 28a is coupled rotatably to the above-described link 26a through a shaft 29a, whereas the other end is coupled rotatably to a shaft 30a mounted on the fixed portion 4b of the trailing plate clamp means.

Also, one end of the link 28b is coupled rotatably to the above-described link 26b through a shaft 29b, whereas the other end is coupled rotatably through a shaft 30b to a bracket 64 as a receiving portion forming the compensation means to be described later.

One end of the two ends of the coupling link 31 is coupled rotatably to the above-described shaft 29a and the other end is coupled rotatably to the shaft 29b, respectively, to form the parallel link mechanism together with the above-described links 26a and 28a and the links 26b and 28b.

This coupling link 31 is coupled through a shaft 35 to a tip end member 34 mounted at a tip end of a piston rod of a drive source mounted rotatably through a shaft 32 on the fixed portion 4b of the trailing plate clamp means, i.e., a small output crevice type cylinder 33 (hereinafter also referred to as a cylinder 33) operated at a low pressure, for example, 1.0 Mpa or less.

The compensation means will be described below.

The bracket 64 bearing as a receiving portion forming the compensation means is mounted on a bearing unit 63 provided movably in the transverse direction of the trailing plate 2 along a guide 62 as a guide portion. This bracket 64 is coupled with a piston rod of a small output adjusting and driving source disposed in the fixed portion 4b of the trailing plate clamp means forming the trailing plate clamp means, i.e., a pneumatic cylinder 65 (hereinafter simply referred to as a cylinder 65) operated at a low pressure of, for example, 1.0 Mpa or less, and is operatively adjusted and moved in the transverse direction of the trailing plate 2 together with the bearing unit 63.

Figure 17:
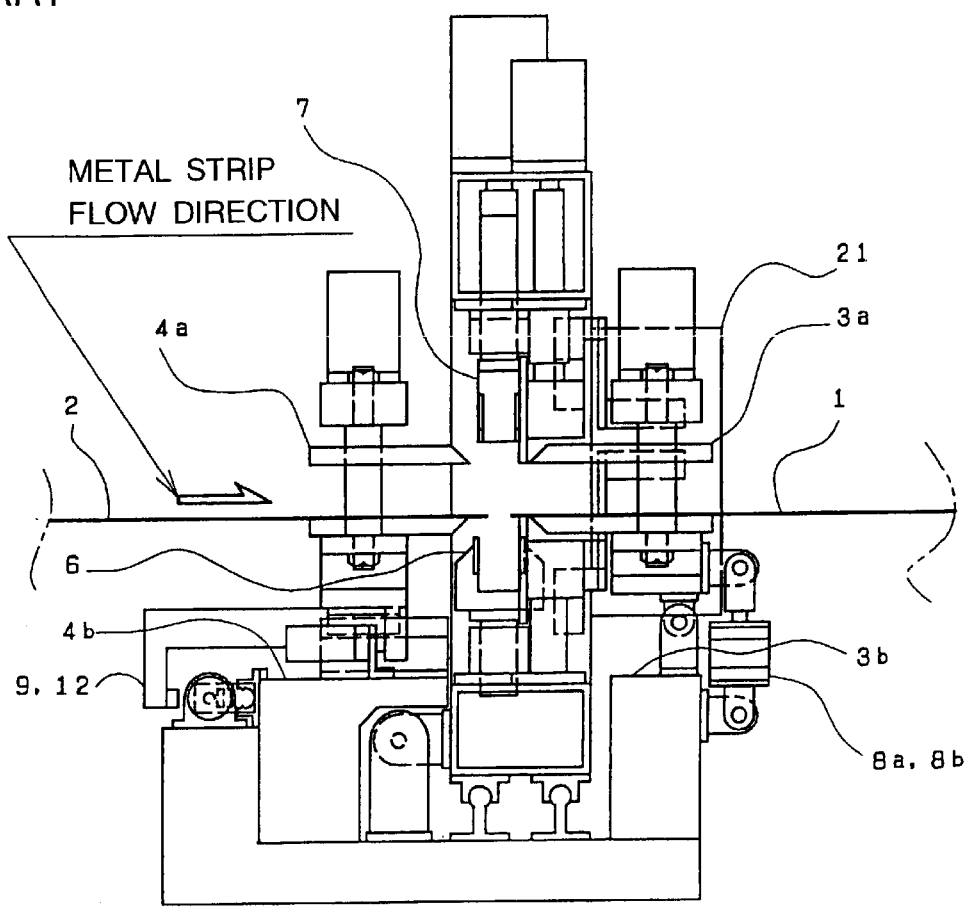
FIG. 17 is a frontal view of a conventional seam welding apparatus.
Figure 18:
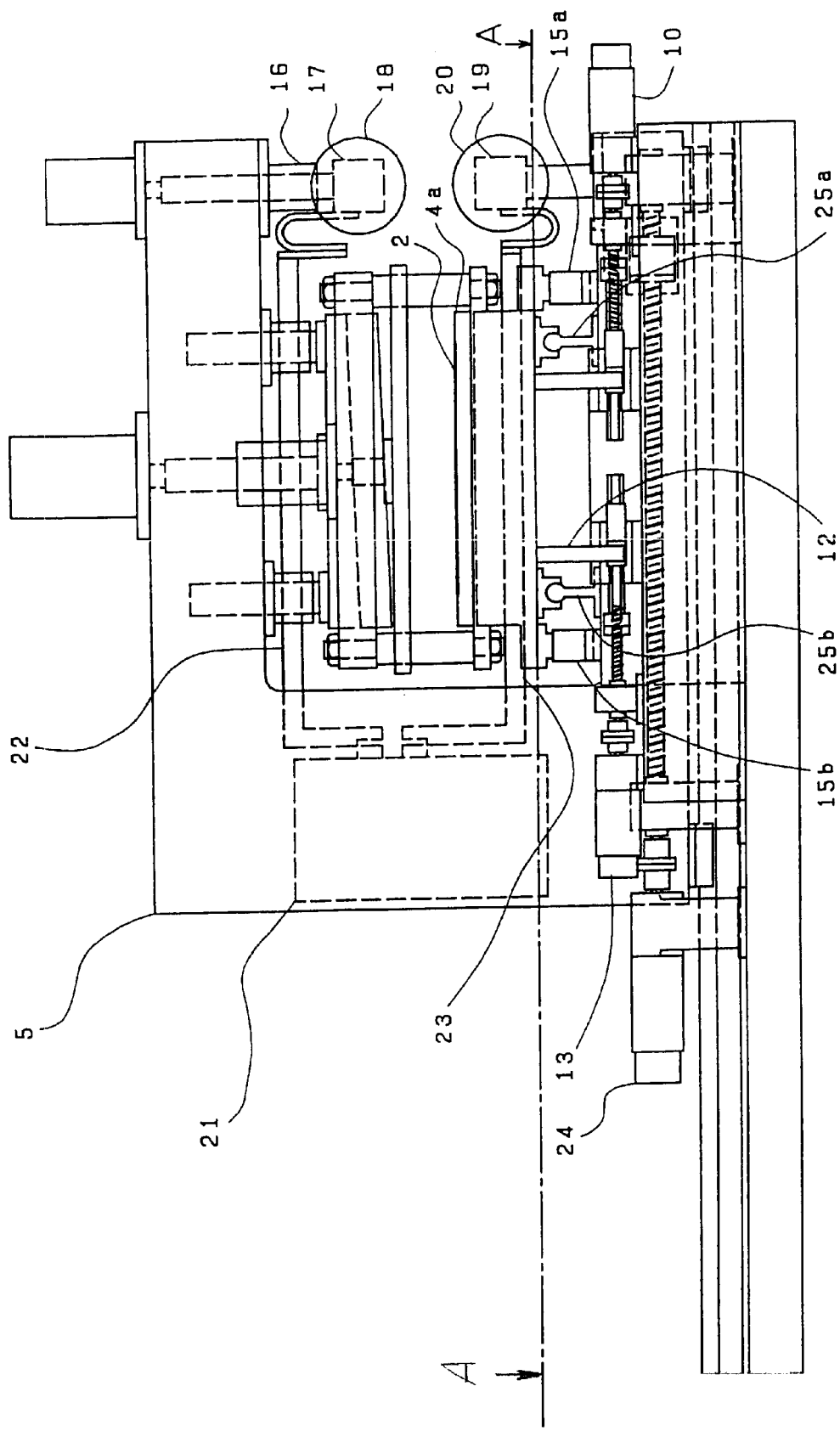
FIG. 18 is a side elevational view of the conventional seam welding apparatus.
Figure 19:
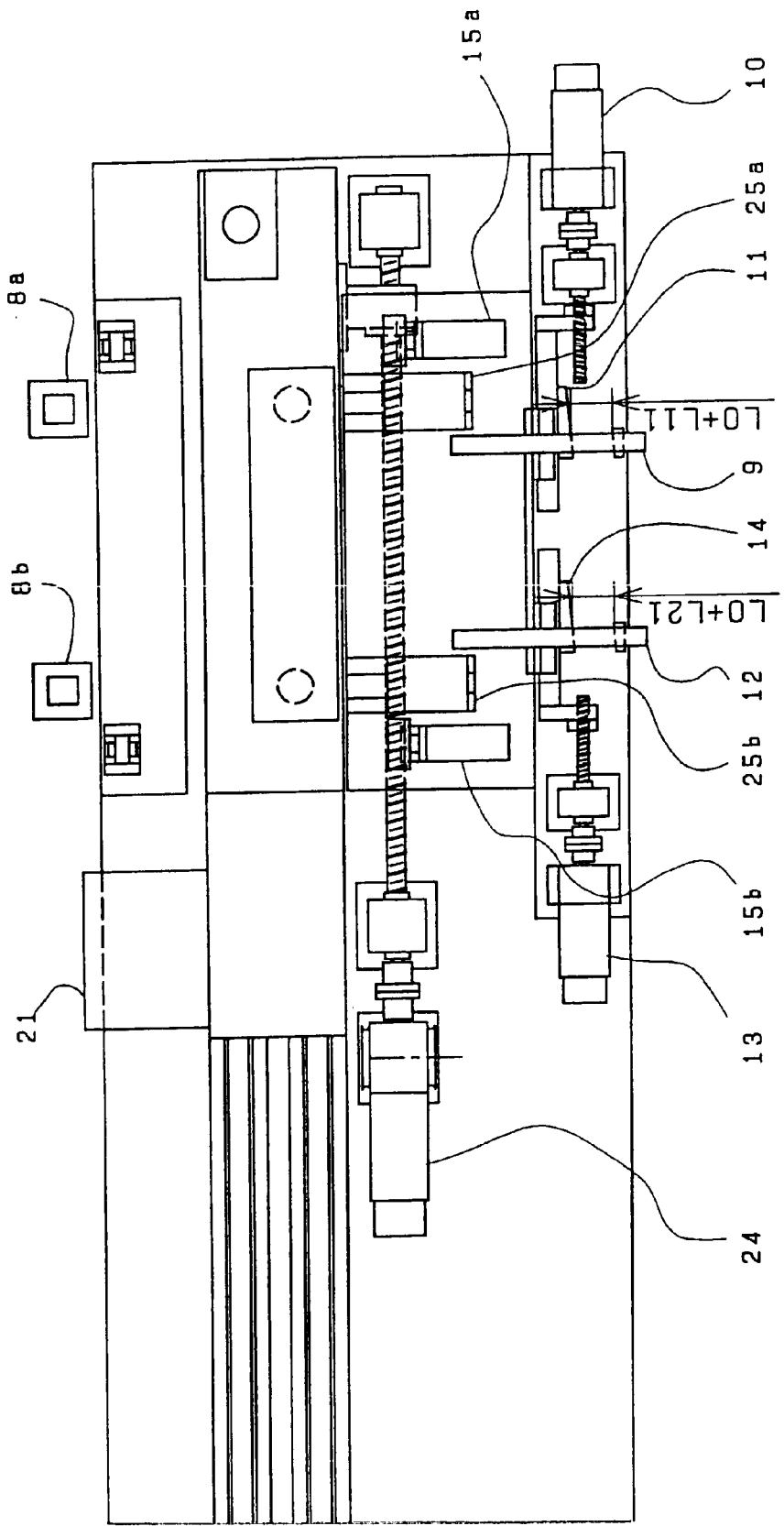
FIG. 19 is a view taken along the cross-section A—A of FIG. 18.

The structure or system of the respective stoppers of the stop means for providing the optimum overlapped alignment amount from the weld start end to L1 to the weld terminal end L2, i.e., stopping the forward movement of the movable portion 4a of the trailing plate clamp means toward the movable portion 3a of the leading plate clamp means is the same as the conventional system described in conjunction with FIGS. 17 to 19. Also, this stopper means may be the same as that shown in the first embodiment.

Upon setting the overlapped alignment amount, a weld start end stopper 9 mounted on the movable portion 4a of the trailing plate clamp mean's for moving toward the movable portion 3a of the leading plate clamp means and a weld start end adjusting stopper 11 mounted on the fixed portion 4b of the trailing plate clamp means and moved by a weld start end overlapped alignment amount adjusting and driving unit 10 is set at the optimum overlapped alignment amount L1 at the weld start end.

For this reason, the weld line is adjusted to the sum of the cutting of the width L0 and L11 in view of the mounting width position W2 of the weld start end stopper 9 and the weld start end adjusting stopper 11 relative to the plate width W1 of the plates to be welded together.

In order to obtain the optimum overlapped alignment amount L2 at the weld terminal end, the interval between the weld terminal end stopper 12 mounted on the movable portion 4a of the trailing plate clamp means and moving toward the movable portion 3a of the leading plate clamp means and the weld terminal end adjusting stopper 14 mounted on the fixed portion 4b of the trailing plate clamp means and moving by the weld terminal end overlapped alignment amount adjusting and driving unit 13 is adjusted to the distance obtained by adding L21 in view of the mounting width position W2 of the weld terminal end adjusting stop 14 and the weld terminal end stop 12 to the cutting width L0 relative to the plate width W1 of the plates to be welded together.

Thus, after the positions of the weld start end adjusting stopper 11 and the weld terminal end stopper 14 have been adjusted, the link drive source disposed in the fixed portion 4b of the trailing plate clamp means and the cylinder 33 as the link drive source are operated toward the fully extended dead center vicinity of the parallel link mechanism (links 26a and 28a, links 26b and 28b and coupling link 31) to hold the overlapped alignment position.

Furthermore, when the thus set overlapped alignment amount is to be finely adjusted, the shaft 30b of the parallel link mechanism is further moved to the fully extended dead center of the links 26b and 28b by the cylinder 65 by the above-described compensation means to thereby compensate for the overlapped alignment amount.

In accordance with this second embodiment, in the same manner as in the first embodiment, even if the component by the large weld pressure is applied to reduce the overlapped alignment of weld, only a small force is applied on the side of the adjusting and driving source 65, and it is possible to maintain and hold the compensation amount and the overlapped alignment amount upon the welding by the cylinder 65 as the overlapped alignment amount adjusting and driving source and the cylinder 33 as the small output link drive source.

Embodiment 3

In embodiment 3, in the structure of the above-described first embodiment, the overlapped alignment amount compensation means provided on the side of the movable portion 3a of the leading plate clamp means is removed completely, and a device is applied to the shearing means whereby the compensation means for compensating the predetermined overlapped alignment amount is dispensed with.

Namely, when the plates are overlapped with each other in advance, the plates are cut by the shearing means so that the overlapped alignment amount on the weld terminal end side is greater than the overlapped alignment amount on the weld start end side. A pair of link mechanisms forming the trailing plate clamp moving means are extended at the same distance in the fully extended direction to thereby obtain a desired overlapped alignment amount.

This shearing means is provided with a tailing end cutter for cutting the trailing end of the leading plate and a leading end cutter for cutting the leading end of the trailing plate, and is adapted so that the overlapped alignment amount on the weld terminal end side is larger than the overlapped alignment amount on the weld start end side when the plates are overlapped with each other in advance. The shearing means is adapted to cut the trailing end of the leading plate 1 held by the movable portion 3a of the leading plate clamp means and the leading end of the trailing plate 2 held by the movable portion 4a of the trailing plate clamp means before the overlap alignment.

Figure 8:
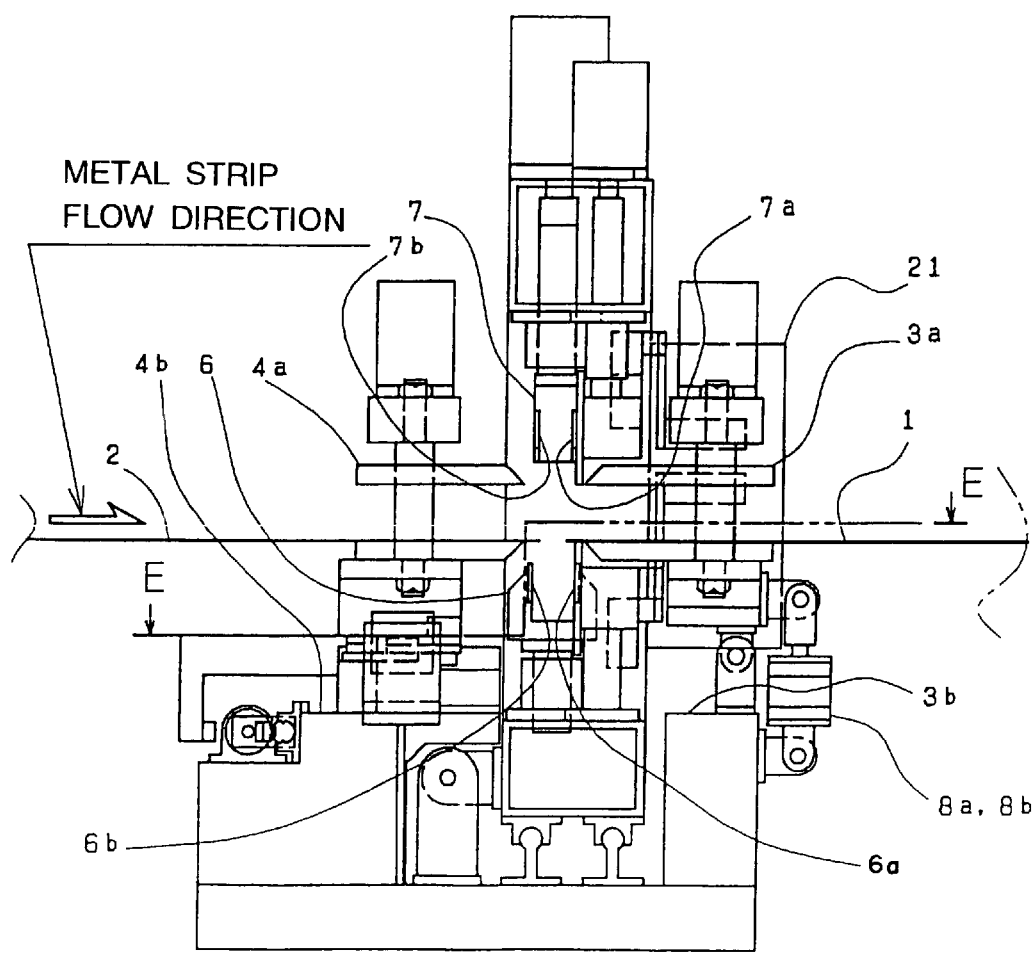
FIG. 8 is a frontal view of a seam welding apparatus for a process line of metal plates in accordance with a third embodiment.
Figure 9:
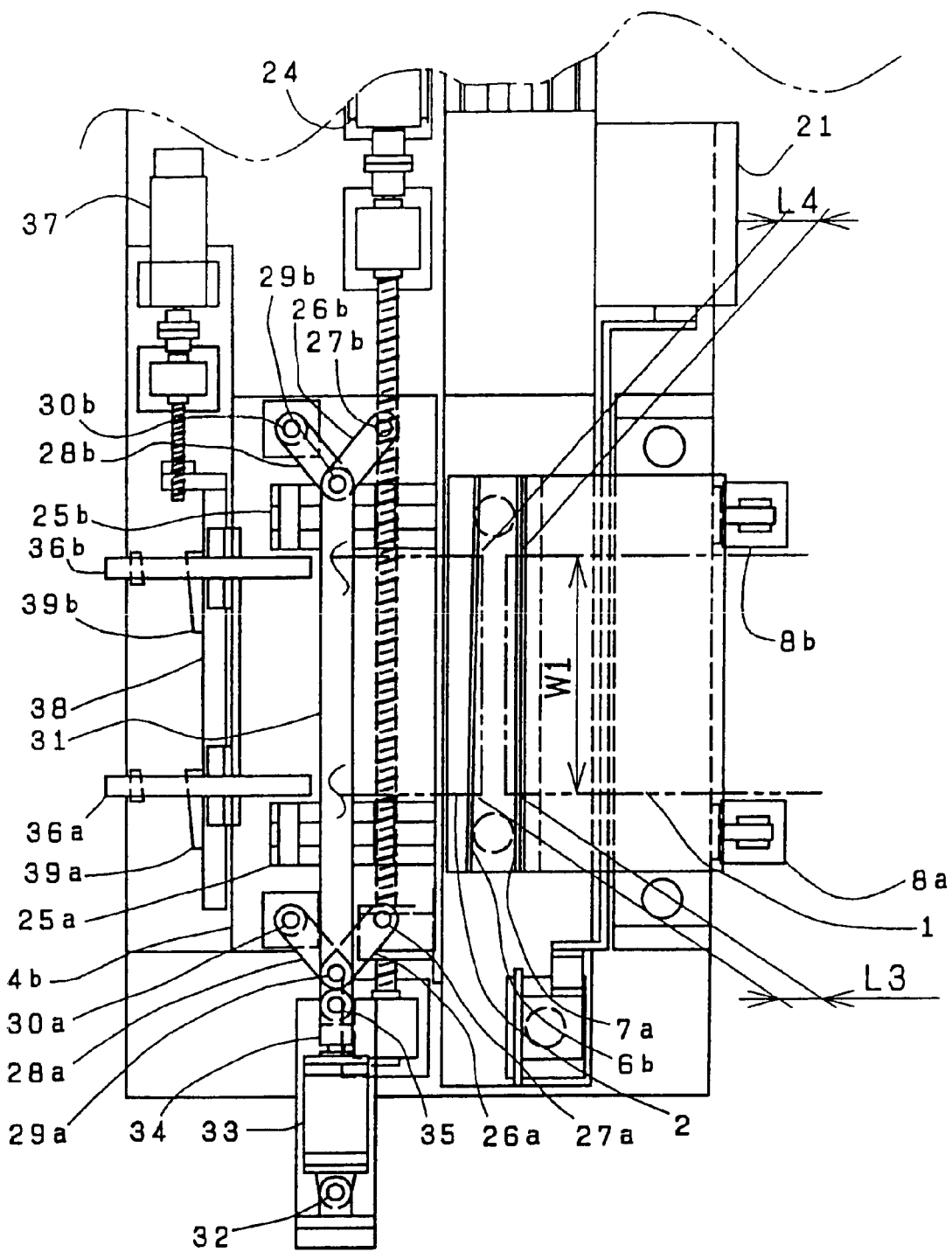
FIG. 9 is a cross-sectional view taken along the line E—E of FIG. 8.

The third embodiment will now be described with reference to FIGS. 8 and 9. FIG. 8 is a frontal view of a seam welding apparatus for a process line of metal plates. FIG. 9 is a view taken along the surface E—E of FIG. 8. Incidentally, the same reference numerals as those in the drawings of the first and second embodiments and the conventional case indicate the same function and structure and the detailed explanation therefor will therefore be omitted.

In FIGS. 8 and 9, the shearing means shown is composed mainly of an upper blade unit 7 and a lower blade unit 6. The lower blade unit 6 is an integral blade having a U-shaped cross-section provided with a leading plate lower blade 6a and a trailing plate lower blade 6b. In the same way, also, the upper blade unit 7 is an integral blade having a U-shaped cross-section provided with a leading plate upper blade 7a and a trailing plate upper blade 7b. The two units are arranged so that the U-shapes face each other from above and below.

The trailing end cutter is composed in combination of the above-described leading plate lower blade 6a and the leading plate upper blade 7a for shearing the trailing end of the leading plate 1 perpendicular to the flow direction of the metal strips.

On the other hand, the leading end cutter is composed in combination of the trailing plate lower blade 6b and the trailing plate upper blade 7b for shearing the leading end of the trailing plate 2 in the same manner.

In this third embodiment, as described above, the two blades of the trailing end cutter and the leading end cutter for shearing the leading end of the trailing plate 1 and the trailing end of the leading plate 2 simultaneously are provided. In the members having a U-shaped cross section and extending in the transverse direction, the blade units, namely the lower blade unit 6 and the upper blade unit 7 having the U-shape in cross section in the third embodiment in which the cutting interval is set so that the cutting interval of the two blades is the overlapped alignment amount (width) calculated in response to the various conditions such as material of the members to be welded together are prepared in advance.

In this case, in the plate width W1 of the metal strips as the members to be welded together, namely the leading plate 1 and the trailing plate 2, the cutting interval from the position where the trailing end of the leading plate 1 is sheared by the leading plate lower blade 6a and leading plate upper blade 7a as the trailing end cutters to the leading end of the trailing plate is sheared by the training plate lower blade 6b and the trailing plate upper blade 7b as the hole forming cutter is L3 on the weld start end side and L4 that is smaller than L3 by the escape amount by the welding at the weld terminal end side.

The shearing means is thus constructed.

Incidentally, in the drawings, the structure of the movable portion 3a of the leading plate clamp means for holding the leading plate 1 is the same as the unit portion of FIGS. 17, 18 and 19.

In order to hold the trailing plate 2 to obtain the overlapped alignment amount of weld, the movable portion 4a of the trailing plate clamp means moving toward the trailing end of the leading plate 1 is the same as the unit portion of the first embodiment shown in FIGS. 1, 2 and 3.

Accordingly, in accordance with the foregoing third embodiment, the trailing plate 2 (tip end) sheared by the shearing means is simply moved through the same distance toward the trailing end side of the leading plate 1 both on the weld start end side and the weld terminal end side to provide the optimum overlapped alignment for the welding at the weld start end side and the optimum overlapped alignment that is larger than that of the weld start end side in view of the escape amount upon welding on the weld terminal end side.

Thus, it is unnecessary to provide a special compensation means for further adjusting the predetermined overlapped alignment amount, and the shearing interval in the shearing means is simply set in advance whereby it is possible to obtain the desired overlapped alignment compensation amount.

Embodiment 4

In a fourth embodiment, in the structure according to the first embodiment, another overlapped alignment amount compensation means is provided instead of the overlapped alignment amount compensation means (hereinafter simply referred to as a compensation means) provided on the side of the movable portion 3a of the leading plate clamp means.

The overlapped alignment compensation means is provided on the side of the movable portion 4a of the leading plate clamp means. More specifically, a shaft of the tilt pivot of the movable portion 3a of the leading plate clamp means, namely the tilt pivot arranged on the weld start end side in the transverse direction of the leading plate is used as the eccentric shaft, and the shaft of the tilt pivot on the weld terminal end side is used as the eccentric shaft that has a larger eccentric amount than the eccentric amount of the above-described eccentric shaft on the weld start end side. Eccentric shaft drive sources are arranged for both eccentric shafts. The overlapped alignment amount of the leading plate 1 held by the movable portion 3a of the leading plate clamp means to the trailing plate 2 is adjustable.

This fourth embodiment will now be described with reference to FIGS. 10 to 16.

Figure 10:
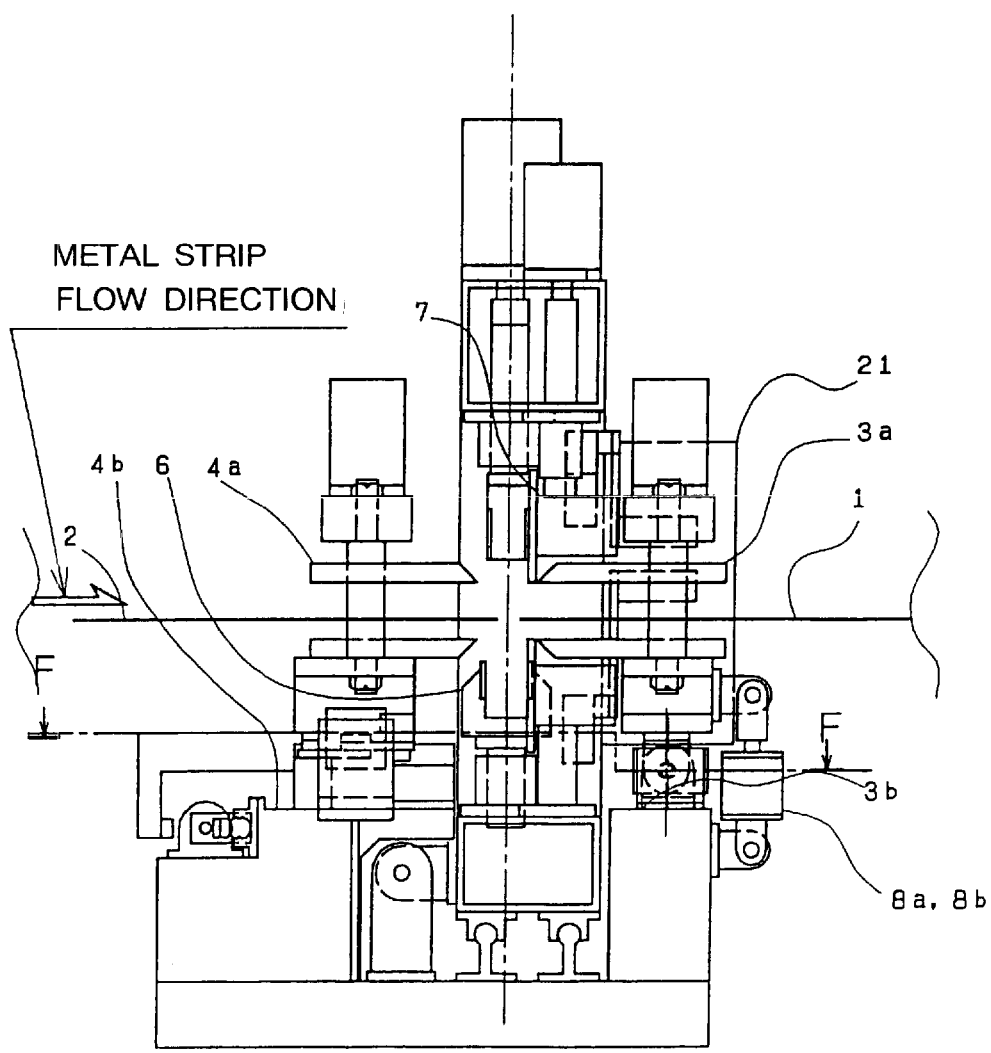
FIG. 10 is a frontal view of a seam welding apparatus in accordance with a fourth embodiment.
Figure 11:
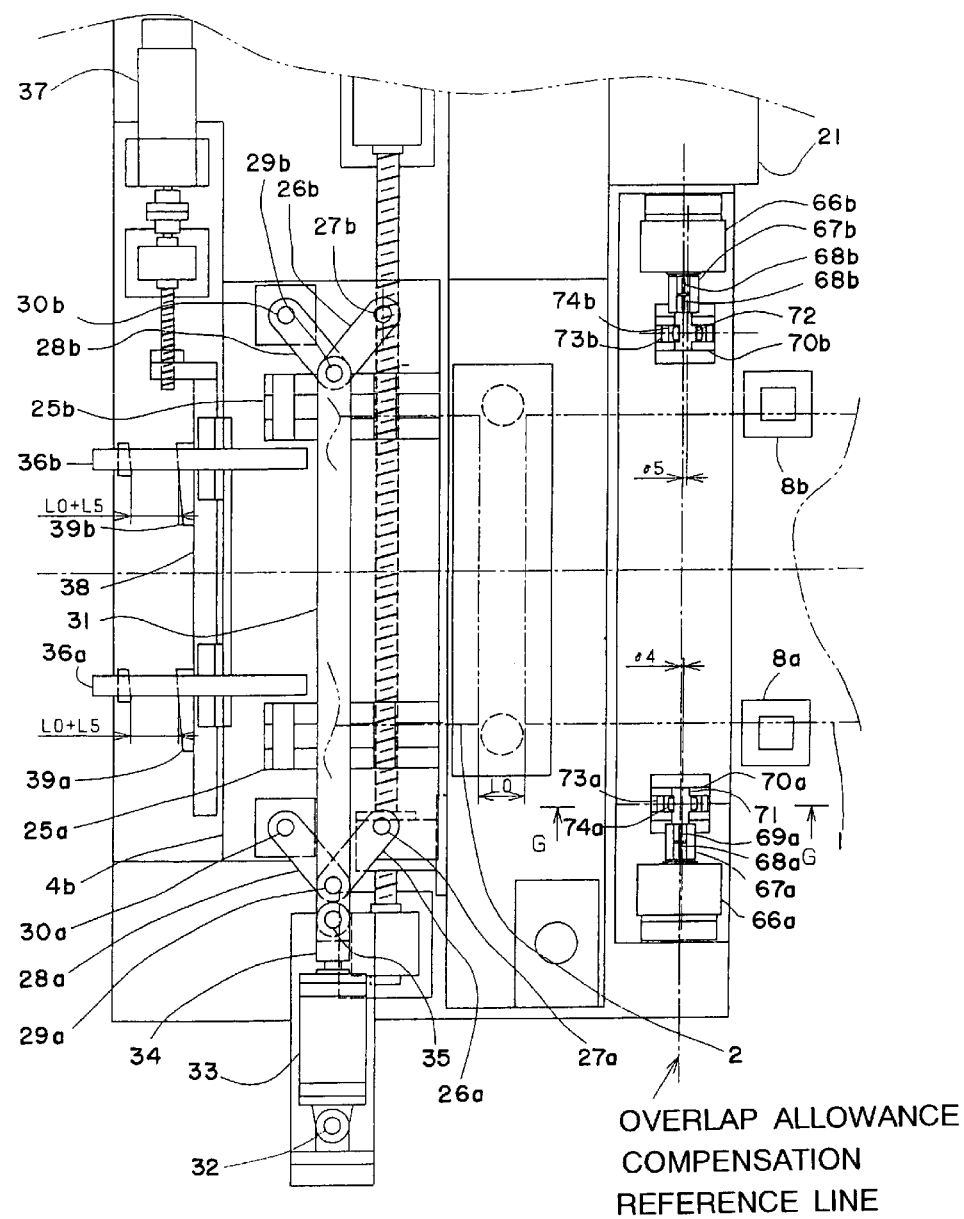
FIG. 11 is an enlarged view along a cross-section F—F of FIG. 10.
Figure 12:
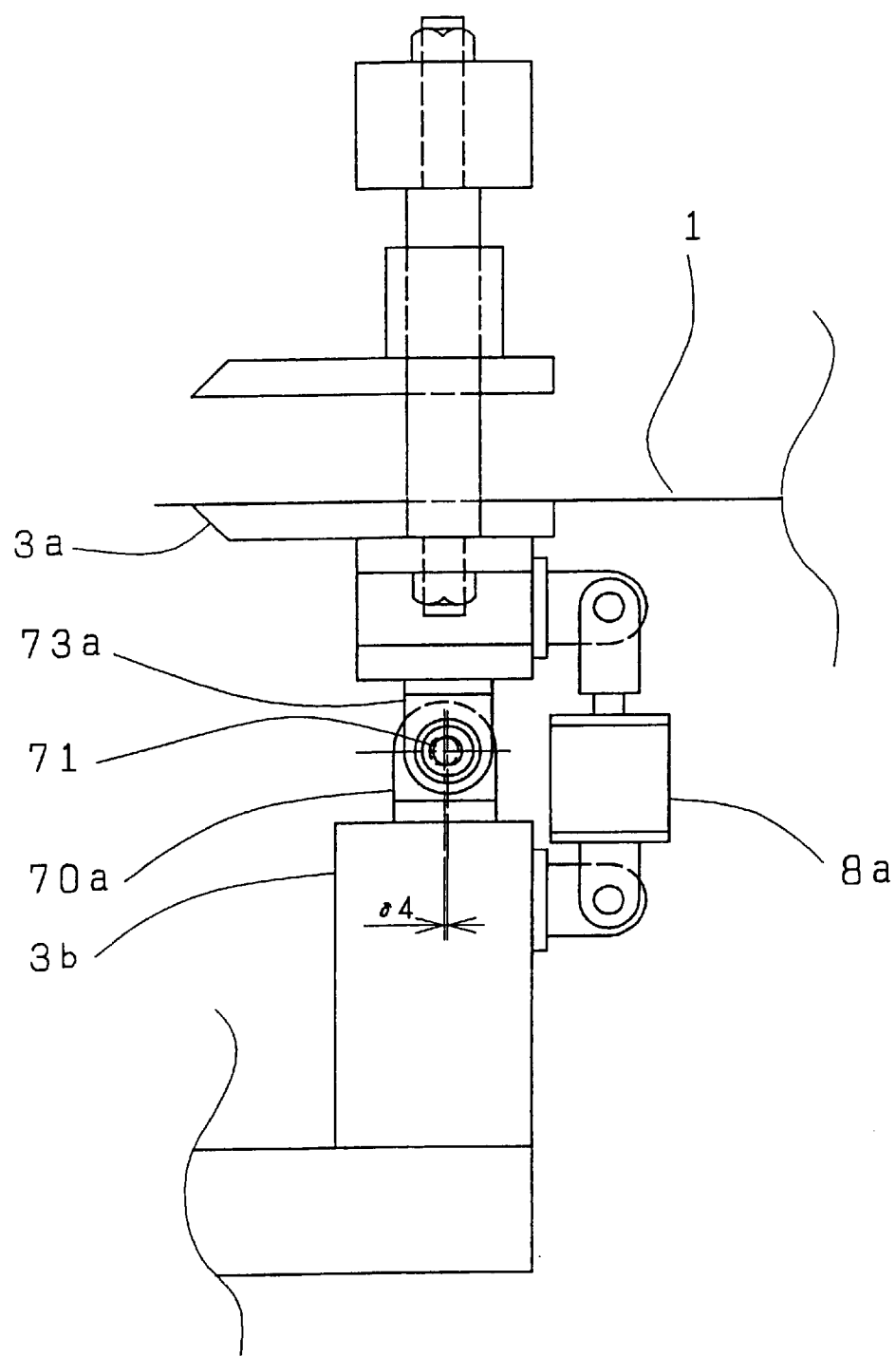
FIG. 12 is an enlarged view along a cross-section G—G of FIG. 11.
Figure 13:
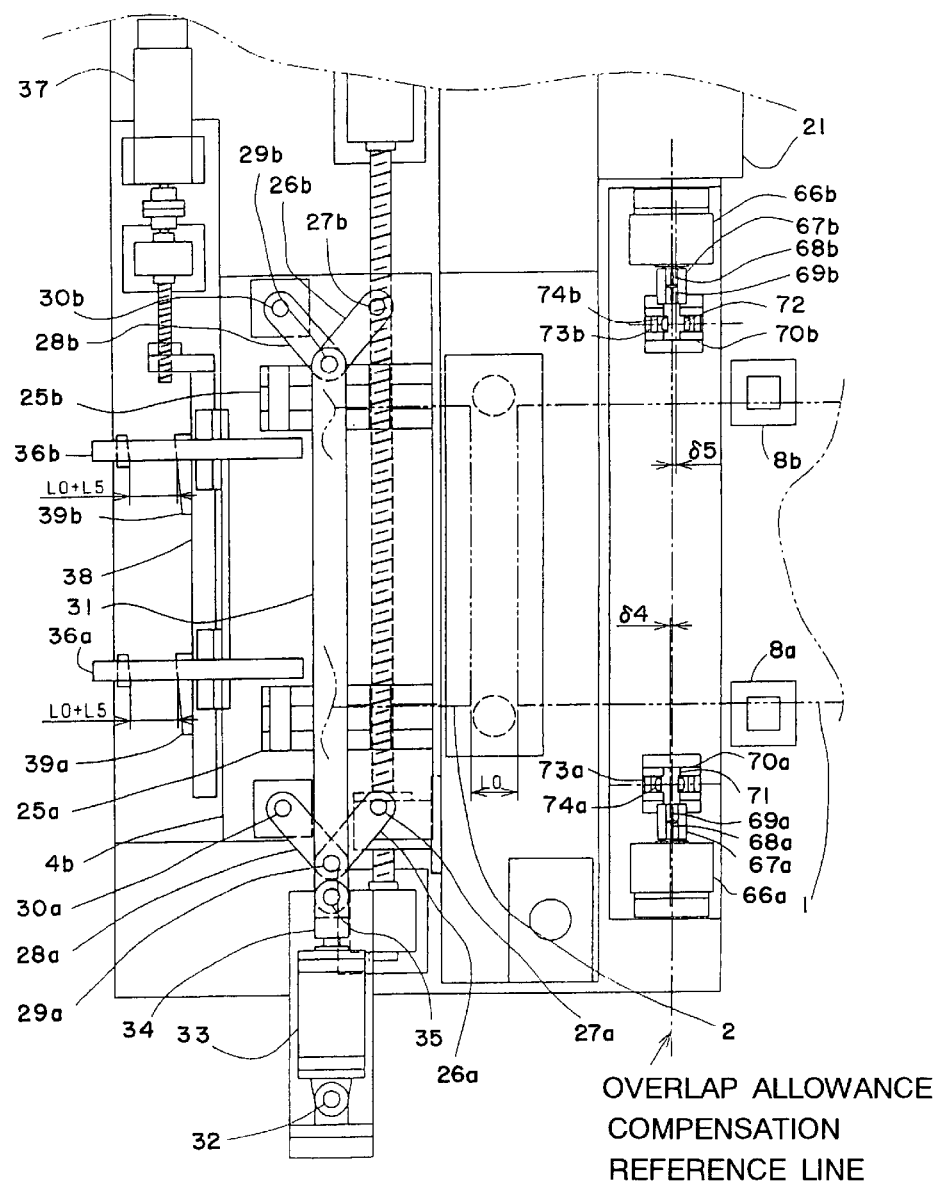
FIG. 13 is a view in which one part in FIG. 11 is moved.
Figure 14:
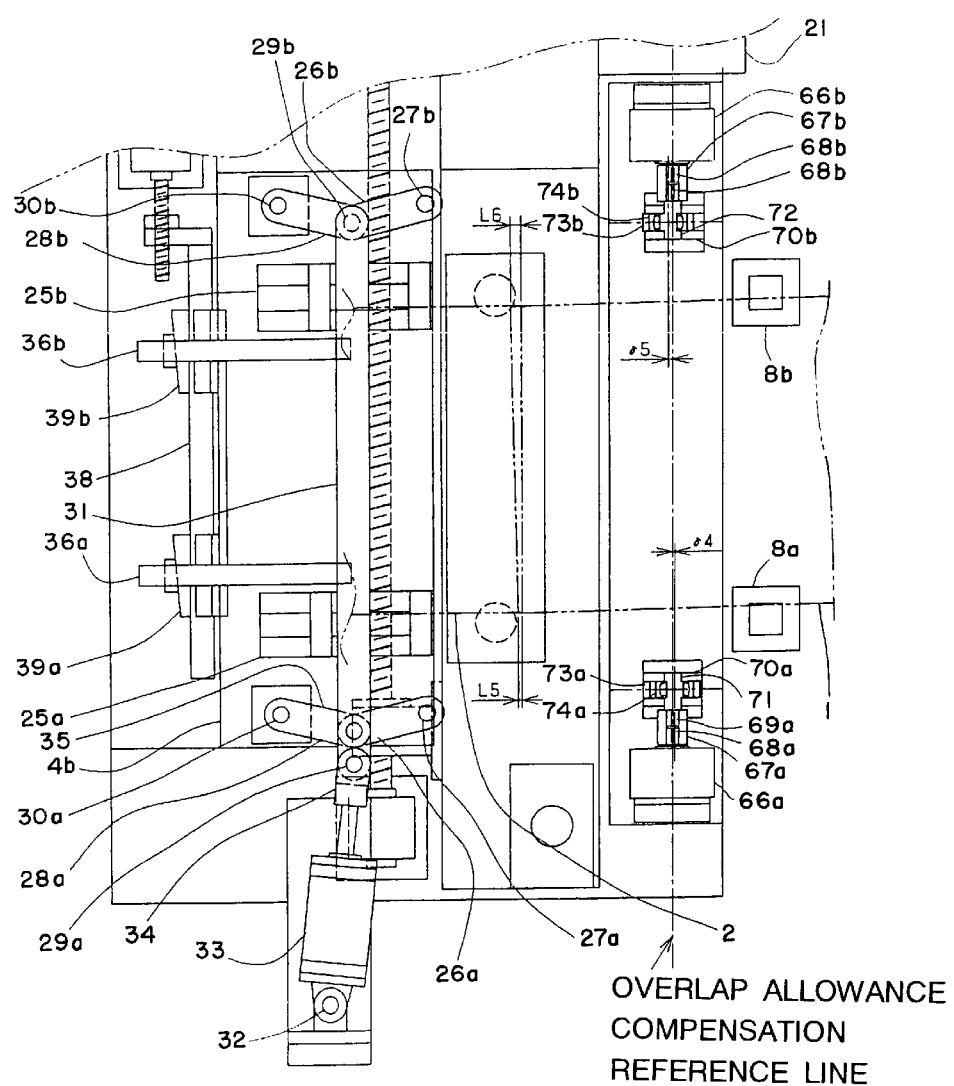
FIG. 14 is a view showing an overlapped alignment compensation case 1.
Figure 15:
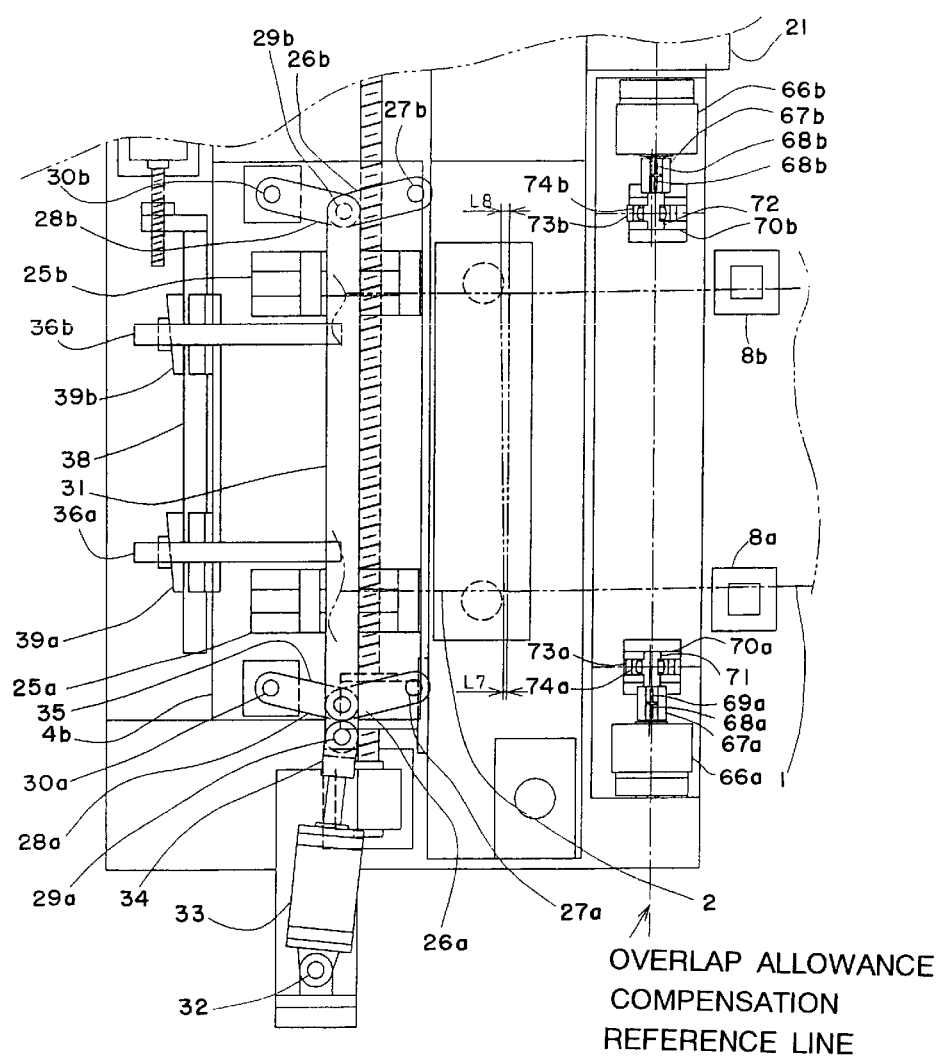
FIG. 15 is a view showing an overlapped alignment compensation case 2.
Figure 16:
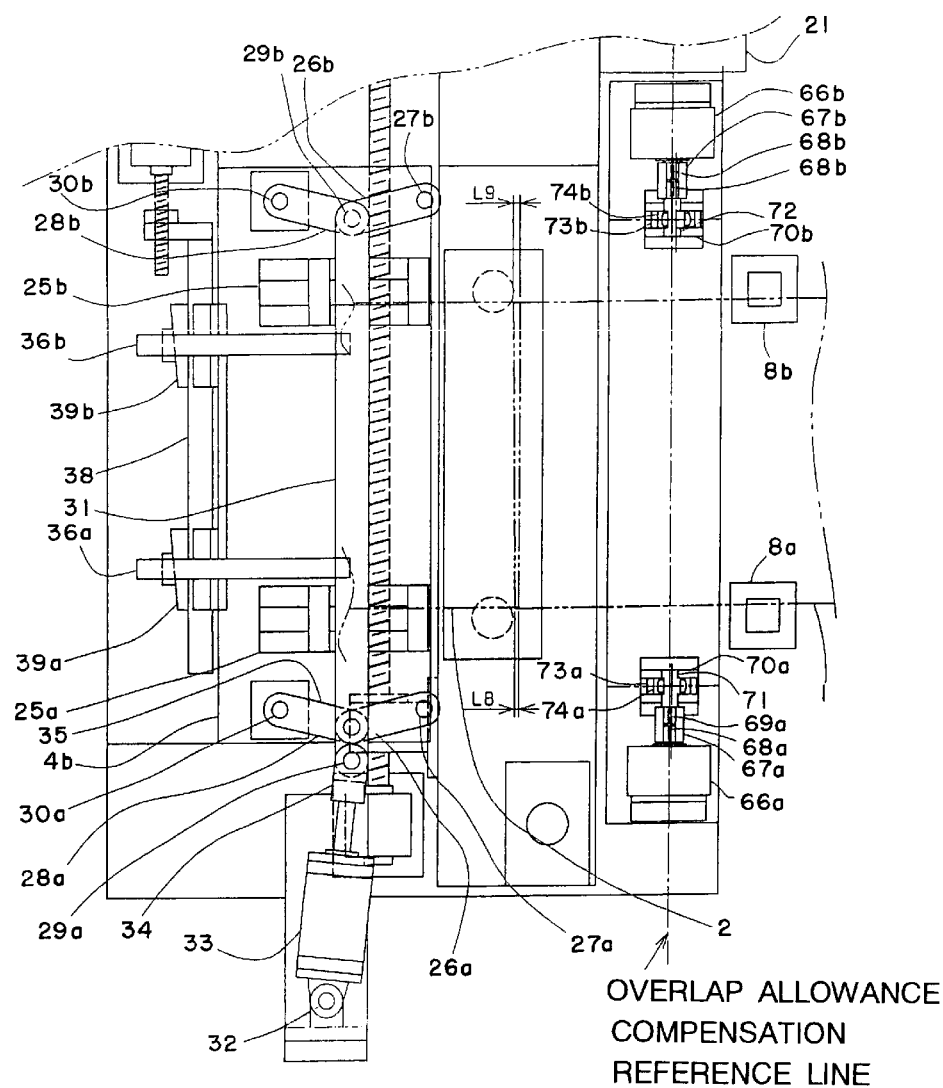
FIG. 16 is a view showing an overlapped alignment compensation case 3.

FIG. 10 is a frontal view showing one embodiment of a seam welding apparatus for a process line of metal plates. FIG. 11 is an enlarged view showing a cross-section F—F of FIG. 10. FIG. 12 is a cross-sectional view taken along the surface G—G of FIG. 11. FIG. 13 is a view where one part in the drawing of FIG. 11 is moved. FIG. 14 is a view showing an overlapped alignment compensation case 1. FIG. 15 is a view showing an overlapped alignment compensation case 2. FIG. 16 is a view showing an overlapped alignment compensation case 3. Incidentally, the same reference numerals as those in the drawings of the first to third embodiments and the conventional case indicate the same function and structure and the detailed explanation therefor will be omitted.

In FIGS. 10 to 13, the movable portion 3a of the leading plate clamp means is provided with a swing motor 66a that may swing through, for example, 180 degrees as an adjusting driving source in the fixed portion 3b of the trailing plate clamp means in the tilt pivot on the weld start end side. The rotational torque of the swing motor 66a is transmitted to the eccentric shaft 71 through a key 68a fitted in an output shaft portion of the swing motor 66a, a key 69a fitted in a shaft portion of the eccentric shaft 71 of eccentricity δ4 and a coupling 67a.

This eccentric shaft 71 is rotatably supported to the bracket 70a mounted on the fixed portion 3b of the leading plate clamp means. An automatic centering bearing 74a is fitted in the eccentric portion of the eccentric shaft 71 and this automatic centering bearing 74a is fitted in a bracket 73a mounted on the movable portion 3a of the leading plate clamp means.

On the other hand, also the tilt pivot on the weld terminal end side of the movable portion 3a of the leading plate clamp means is structured in the same manner as described above. Namely, character 66b denotes a swing motor that is mounted on the fixed portion 3b of the leading plate clamp means and swingably moves through 180 degrees, character 68b denotes a key fitted in an output shaft portion of the swing motor 66b, character 69b denotes a key fitted in a shaft portion of an eccentric shaft 72 of eccentric amount δ5, and character 67b denotes a coupling. The eccentric shaft 72 is rotatably supported to a bracket 70b mounted on the fixed portion 3b of the leading plate clamp. Also, an automatic centering bearing 74b is fitted in the eccentric portion of the eccentric shaft 72 and this automatic centering bearing 74b is fitted in a bracket 73b mounted on the movable portion 3a of the leading plate clamp means.

The eccentric portion of the above-described eccentric shaft 71 and the eccentric portion of the eccentric shaft 72 are both adapted so that the large components upon welding and the like are not applied to the sides of the swing motors 66a and 66b and the operating original of 180 degrees and the operating point of 180 degrees are both dead points.

Figure 20:
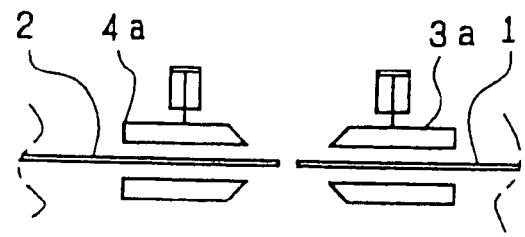
FIG. 20 is a view showing a first step of the conventional apparatus.
Figure 21:
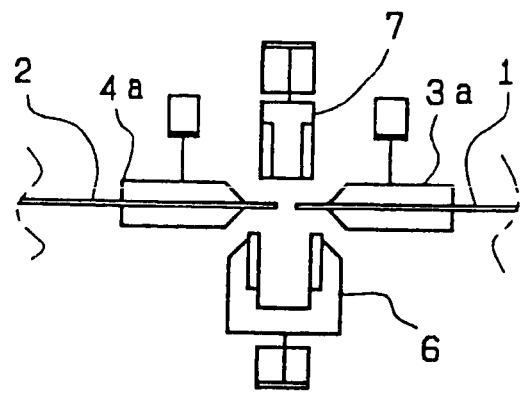
FIG. 21 is a view showing a second step of the conventional apparatus.
Figure 22:
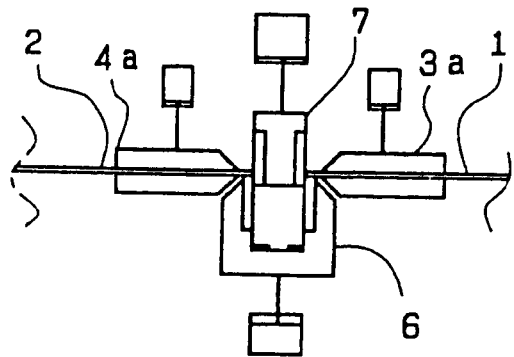
FIG. 22 is a view showing a third step of the conventional apparatus.

By the way, as shown in FIG. 11, the respective eccentric positions of the eccentric shaft 71 and the eccentric shaft 72 are set at the right side dead center ends of the overlap allowance compensation reference line shown. Thereafter, as shown in FIGS. 20 to 22, the trailing end of the leading plate 1 and the leading end of the trailing plate 2 are sheared at an interval L0.

Subsequently, after the shearing, during the working step of the overlapped alignment in the conventional case described in conjunction with FIGS. 23 and 24, as shown in FIG. 14, the eccentric position of the eccentric shaft 72 is rotated by means of the swing motor 66b by 180 degrees on the left side of the overlapped alignment amount compensation reference line.

The overlapped alignment amount L6 at the weld terminal side may be greater than the optimum overlapped alignment amount L5 at the weld start end side, as an optimum overlapped alignment amount compensation case 1 in response to various conditions such as a plate thickness of the plates to be welded together by this rotation.

Namely, it is possible to compensate for the escape amount by the welding gradually from the weld start end side to the weld terminal end side with respect to the overlapped alignment amount L6 on the weld terminal end side in view of the difference between the mounted position of the eccentric shaft 72 and the weld terminal end position.

A compensation case 2 of the suitable overlapped alignment amount in response to the various conditions such as a plate thickness of the members to be welded together will now be described.

As shown in FIG. 11, the respective eccentric positions of the eccentric shaft 71 and the eccentric shaft 72 are set at the right side dead center ends of the overlap allowance compensation reference line shown. Thereafter, as shown in FIGS. 20 to 22, the trailing end of the leading plate 1 and the leading end of the trailing plate 2 are sheared at an interval L0.

Figure 23:
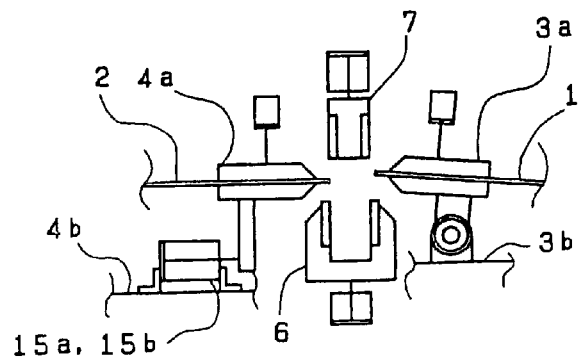
FIG. 23 is a view showing a fourth step of the conventional apparatus.
Figure 24:
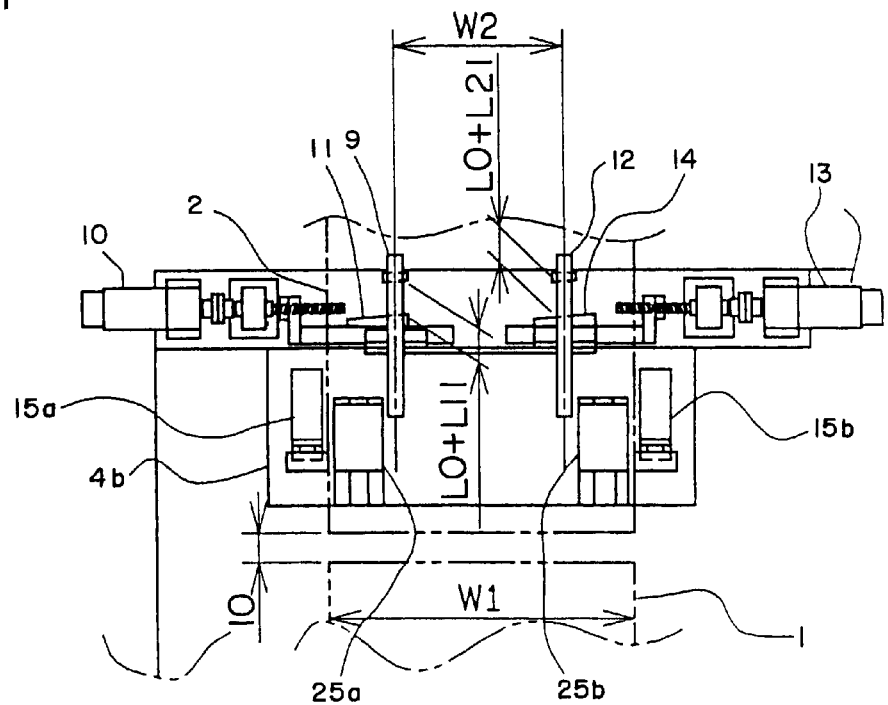
FIG. 24 is a plan view of the conventional apparatus.
Figure 25:
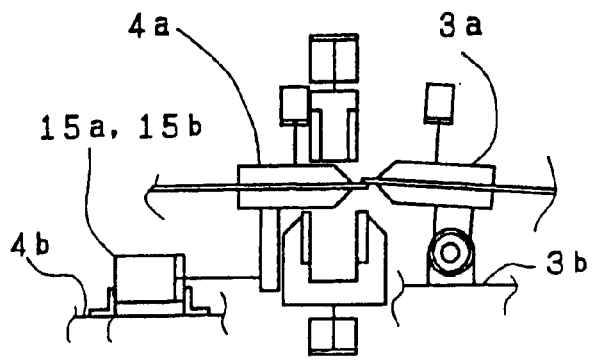
FIG. 25 is a side elevational view showing the overlapped alignment condition.
Figure 26:
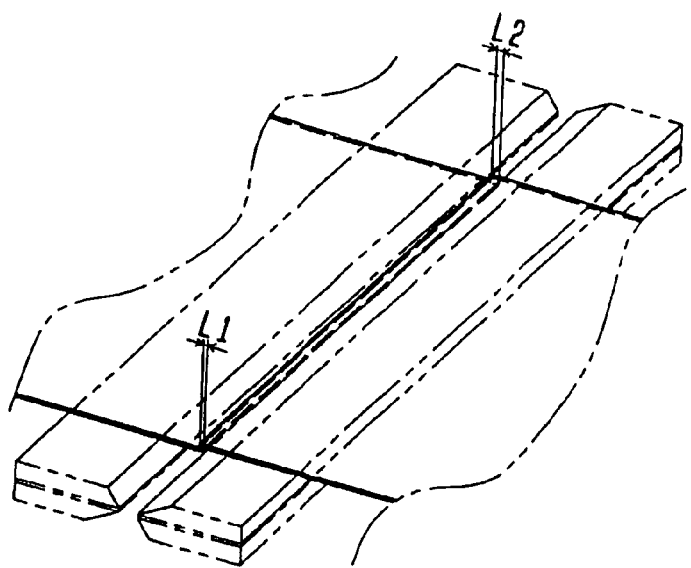
FIG. 26 is an enlarged perspective view showing the overlapped alignment portion.
Figure 27:
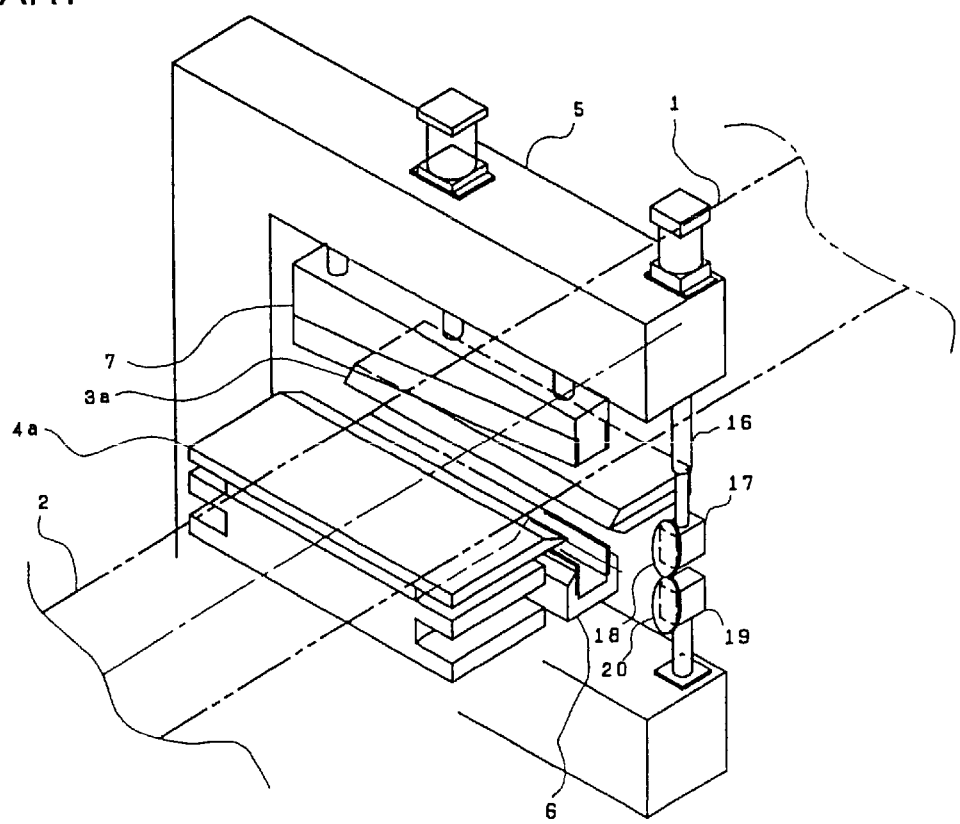
FIG. 27 is a perspective view showing a carriage C frame.
Figure 28:
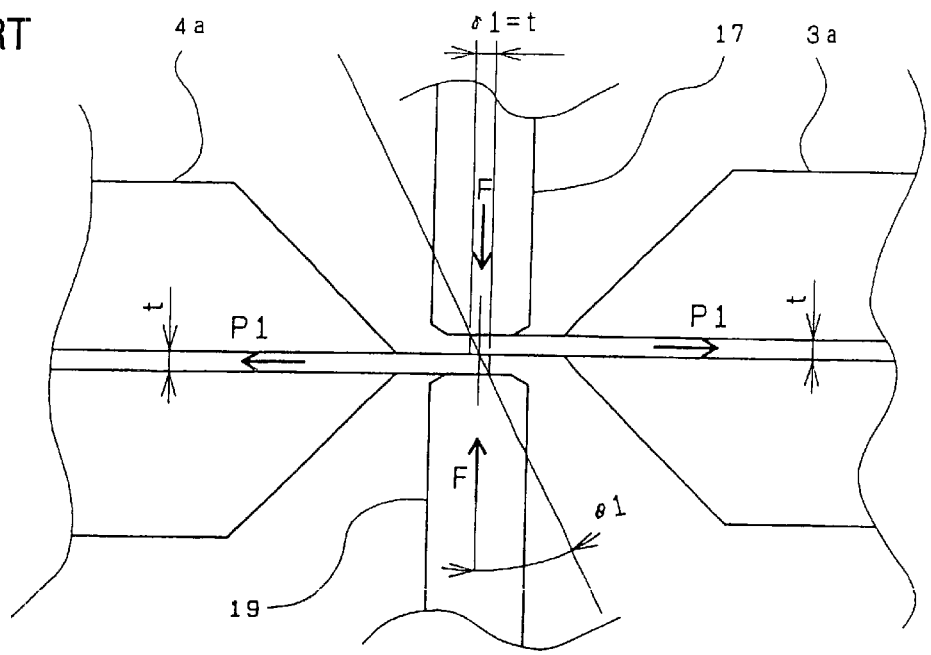
FIG. 28 is a view showing the weld overlapped alignment portion before melting.
Figure 29:
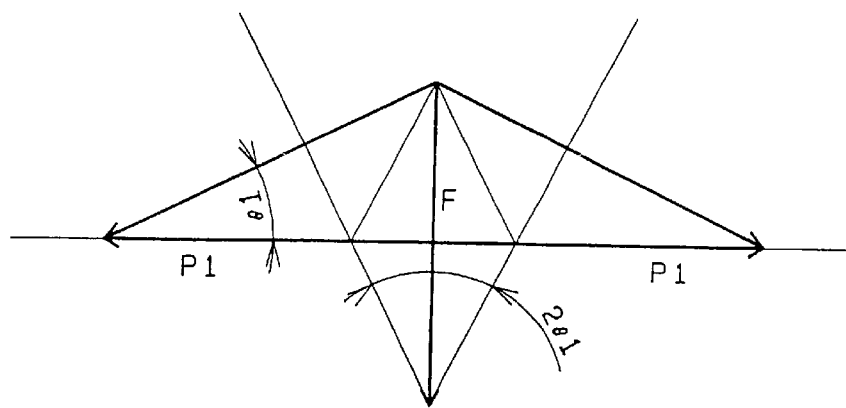
FIG. 29 is a view illustrating a weld pressure immediately before melting and its component.
Figure 30:
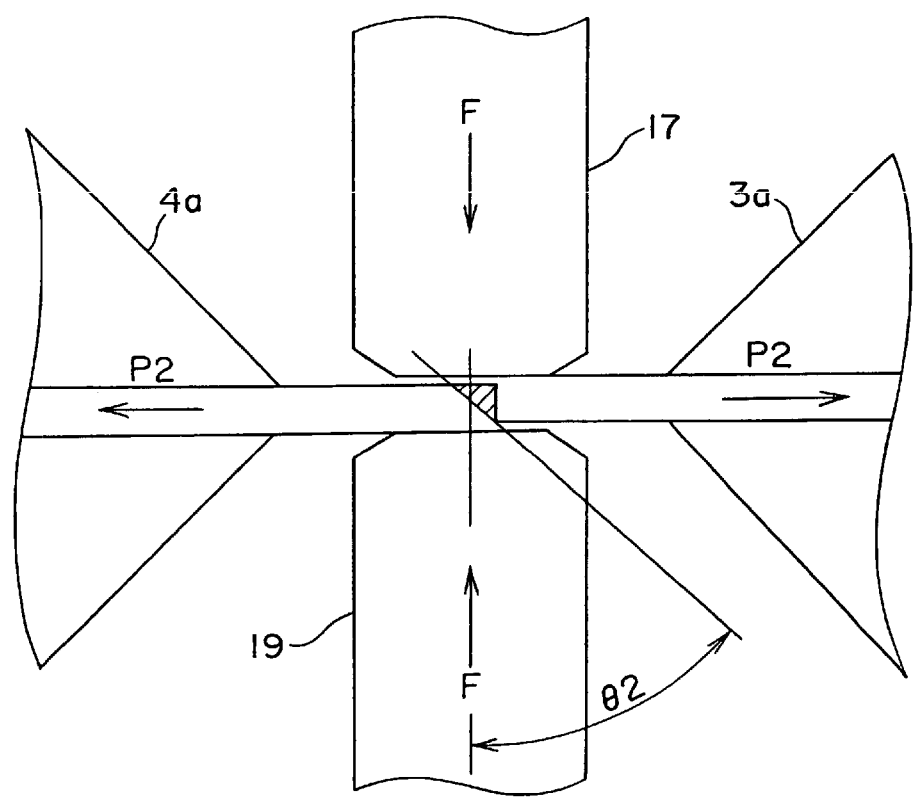
FIG. 30 is a partially enlarged view of FIG. 28 showing the melting just before completion of welding.

After the shearing, during the working step of the overlapped alignment in the conventional case described in conjunction with FIGS. 23 and 24, as shown in FIG. 15, the eccentric position of the eccentric shaft 72 is rotated by means of the swing motor 66*a* and the swing motor 66*b* by 180 degrees to the left side of the overlapped alignment amount compensation reference line, respectively.

The overlapped alignment amount at the weld terminal side may be greater than the optimum overlapped alignment amount L7 at the weld start end side as an optimum overlapped alignment amount by this rotation.

Namely, it is possible to compensate for the escape amount by the welding gradually from the weld start end side to the weld terminal end side, with respect to the overlapped alignment amount L8 on the weld terminal end side in view of the difference between the mounted position of the eccentric shaft 72 and the weld terminal end position.

Incidentally, the compensation amount=L8–L7 in the case 2 is smaller than the compensation amount=L6–L5 in the case 1.

A compensation case 3 of the suitable overlapped alignment amount in response to the various conditions such as a plate thickness of the members to be welded together will now be described.

As shown in FIG. 13, the eccentric position of the eccentric shaft 72 is set at the right side dead center end of the overlap allowance reference line, and the eccentric position of the other eccentric shaft 71 is set at the left side dead center end of the overlap allowance compensation reference line. Thereafter, as shown in FIGS. 20 to 22, the trailing end of the leading plate 1 and the leading end of the trailing plate 2 are sheared at an interval L0.

Subsequently, after the shearing, during the working step of the overlapped alignment in the conventional case described in conjunction with FIGS. 23 and 24, as shown in FIG. 16, the eccentric position of the eccentric shaft 71 is rotated by means of the swing motor 66*a* by 180 degrees to the right side of the overlapped alignment amount compensation reference line.

The overlapped alignment compensation amount at the weld terminal side may more compensate for the eccentric amount δ4 of the eccentric shaft 71 than that at the weld start end side by this rotation by an amount by which a plate thickness difference of the members to be welded together and a distance between the tilt pivot on the weld start end side and the tilt pivot on the weld terminal end side are proportionally distributed.

If the rotational operation is thus performed, the difference between the overlapped alignment amount L9 at the weld terminal end and the overlapped alignment amount L8 at the weld start end as shown in FIG. 16, namely the compensation amount=L9–L8 may provide a different compensation amount from the case 1 and the case 2.

In general, since the overlapped alignment compensation amount is several millimeters at most, the necessary torque for the swing motor 66*a* and the swing motor 66*b* at the tilt pivot of the movable portion 3*a* of the leading plate clamp means in the example described in conjunction with FIGS. 10 to 16 as well as the eccentric amount of the eccentric shafts 71 and 72 is extremely small in conformity with the overlapped alignment compensation amount, the capacity of the motors maybe of a small output adjusting and driving source, for example, a small output type using a low pressure compression air.

Embodiment 5

In a fifth embodiment, the shearing means described in the seam welding apparatus in the third embodiment and the overlapped alignment amount compensation means of the seam welding apparatus in the fourth embodiment are used in combination (not shown).

In the seam welding apparatus in accordance with this fifth embodiment, it is possible to perform the overlapped alignment compensation (one kind) by the shearing means in accordance with the above-described third embodiment and in addition three kinds of overlapped alignment compensation described in conjunction with the cases 1 to 3 in the above-described fourth embodiment. Namely, the four kinds of the compensation may be performed.

According to each invention of the first to third aspects, it is possible to provide a seam welding apparatus that may maintain and hold the overlapped alignment amount using the small output or low pressure drive source without the necessity of using a conventional large output or high pressure drive source, for example, a high pressure hydraulic cylinder or the like.

Also, since it is not necessary to use a cylinder that operates at a high pressure hydraulic pressure as in the conventional case, it is possible to use a low pressure cylinder that leads to the reduction in machine cost or maintenance cost. It is possible to provide a less expensive seam welding apparatus.

According to each invention of the fourth to twelfth aspects, it is unnecessary to use a large output or high-pressure drive source as in the conventional case such as a high-pressure hydraulic cylinder in respect to a large component by a welding pressure. It is possible to maintain and hold the overlapped alignment compensation amount and the suitable overlapped alignment amount by using a small output or low-pressure drive source. It is therefore possible to provide a high performance seam welding apparatus with a good finish.

Also, since it is unnecessary to use a cylinder that operates at high hydraulic pressure as in the conventional case, it is possible to use a low-pressure cylinder that leads to the reduction in machine cost or maintenance cost. It is possible to provide a less expensive seam welding apparatus.

In accordance with each invention of the ninth and tenth aspects, the cutting interval blades formed in view of the desired overlapped alignment compensation amount are provided in the shearing means in advance to thereby make it possible to provide a seam welding apparatus that does not need the overlapped alignment compensation means.

According to an eleventh aspect of the invention, if the number of kinds of compensation of the overlapped alignment amount and the number of kinds of plate thickness are small in accordance with the various conditions such as material or a plate thickness of the plates to the seam welding apparatus, it is possible to provide a less expensive seam welding apparatus without using an expensive continuous position control system of the overlapped alignment amount compensation.

According to a twelfth aspect of the invention, it is possible to compensate for the overlapped alignment amount stepwise by the four kinds of step controls that has a larger number of the kinds of the overlapped alignment compensation than that of the seam welding apparatus in accordance with the eleventh aspect of the invention.

What is claimed is:

1. A seam welding apparatus including a movable portion of a leading plate clamp means adapted to be tiltable for holding the leading plate for overlap alignment, a movable portion of a trailing plate clamp means adapted to be movable toward the leading plate while holding the trailing plate, a shearing means adapted for cutting the trailing end of the leading plate held by the movable portion of the leading plate clamp means and the leading end of the trailing plate held by the movable portion of the trailing plate clamp means before the overlap alignment, a trailing plate clamp moving means adapted to move the movable portion of the trailing plate clamp means for overlapping and aligning the leading end of the sheared trailing plate with the trailing end of the leading plate toward the leading plate, and a welding machine adapted to weld the overlapped alignment portion of the trailing end and the leading end in a transverse direction of the plates, wherein said trailing plate clamp moving means comprises a link mechanism for overlapping and aligning the leading end of the trailing plate with the trailing end of the leading plate in a fully extended condition and a link drive source for actuating said link mechanism.

2. A seam welding apparatus according to claim 1, wherein said trailing plate clamp moving means includes a pair of link mechanism along both side edges of the trailing plate.

3. A seam welding apparatus according to claim 2, wherein said pair of link mechanisms are coupled with a link drive source to form a parallel link mechanism assembled through a coupling link for simultaneously actuating said pair of link mechanism.

4. A seam welding apparatus according to claim 1, wherein the movable portion of the leading plate clamp means has tilt pivots arranged, respectively, on the weld start end side and the weld terminal end side in a transverse direction of the leading plate, either one of the tilt pivots of the weld start end side and the weld terminal end side is arranged to be movable so that the overlapped alignment amount may be adjusted and moved by an overlapped alignment adjusting link mechanism provided with an overlapped alignment adjusting and driving source.

5. A seam welding apparatus according to claim 4, wherein the overlapped alignment amount adjusting link mechanism is arranged to be identified with the overlapped alignment direction in the fully extended condition, and the overlapped alignment adjusting and driving source is coupled substantially in a direction perpendicular to the overlapped alignment direction.

6. A seam welding apparatus according to claim 3, wherein the other end, which is not coupled with the movable portion of the trailing plate clamp means, of the link mechanism of the weld start end side and the weld terminal end side forming the trailing plate clamp moving means is supported movably so that the overlapped alignment amount may be adjusted.

7. A seam welding apparatus according to claim 6, wherein the other end, which is not coupled with the movable portion of the trailing plate clamp means, of the link mechanism of the weld start end side and the weld terminal end side forming the trailing plate clamp moving means is adjusted and moved by a receiving portion for bearing such other end, a guide portion for guiding the receiving portion movably, and an overlapped alignment amount adjusting and driving source for moving the guide portion.

8. A seam welding apparatus according to claim 3, wherein the other end, which is not coupled with the movable portion of the trailing plate clamp means, of the link mechanism of the weld start end side and the weld terminal end side forming the trailing plate clamp moving means is moved in the transverse direction of the trailing plate.

9. A seam welding apparatus according to claim 1, wherein said shearing means is provided with a trailing end cutter for cutting the trailing end of the leading plate and a leading end cutter for cutting the leading end of the trailing plate and a cutting interval between said trailing end cutter and said leading end cutter is adapted so that the overlapped alignment amount at the weld terminal end side is greater than the overlapped alignment amount of the weld start end side in advance when the plates are to be overlapped with each other.

10. A seam welding method using the seam welding apparatus according to claim 1, wherein the plates are cut by said shearing means in advance when the plates are to be overlapped and aligned with each other so that the overlapped alignment amount at the weld terminal end side is greater than the overlapped alignment amount at the weld start end side, and a pair of link mechanisms forming the trailing plate clamp moving means are extended through an equal distance to thereby obtain a desired overlapped alignment amount.

11. A seam welding apparatus according to claim 1, wherein the movable portion of the leading plate clamp means has tilt pivots arranged, respectively, to the weld start end side and the weld terminal end side in the transverse direction of the leading plate, a shaft of the tilt pivot on the weld start end side is used as an eccentric shaft, a shaft of the tilt pivot on the weld terminal end side is an eccentric shaft having a larger eccentric amount than that of the aforesaid eccentric shaft on the weld start end side, and the overlapped alignment amount, relative to the trailing plate, of the leading plate held by the movable portion of the leading plate clamp means is adjustable by the eccentric shaft drive source for rotating both the eccentric shafts individually.

12. A seam welding apparatus according to claim 11, wherein said shearing means is provided with a trailing end cutter for cutting the trailing end of the leading plate and a leading end cutter for cutting the leading end of the trailing plate, and a cutting interval between said trailing end cutter and said leading end cutter is adapted so that the overlapped alignment amount at the weld terminal end side is greater than the overlapped alignment amount of the weld start end side in advance when the plates are to be overlapped with each other.

* * * * *